US012159504B2

(12) United States Patent
Deckenbach et al.

(10) Patent No.: US 12,159,504 B2
(45) Date of Patent: Dec. 3, 2024

(54) METHOD AND DEVICE FOR EXAMINING VALUE DOCUMENTS

(71) Applicant: GIESECKE+DEVRIENT CURRENCY TECHNOLOGY GMBH, Munich (DE)

(72) Inventors: Wolfgang Deckenbach, Schechen (DE); Thomas Giering, Kirchseeon (DE); Thomas Happ, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 297 days.

(21) Appl. No.: 17/632,975

(22) PCT Filed: Aug. 7, 2020

(86) PCT No.: PCT/EP2020/025364

§ 371 (c)(1),
(2) Date: Feb. 4, 2022

(87) PCT Pub. No.: WO2021/028074

PCT Pub. Date: Feb. 18, 2021

(65) Prior Publication Data

US 2022/0277607 A1 Sep. 1, 2022

(30) Foreign Application Priority Data

Aug. 12, 2019 (DE) ..................... 10 2019 005 656.6

(51) Int. Cl.
*G07D 7/121* (2016.01)
*B42D 25/29* (2014.01)

(52) U.S. Cl.
CPC ............. *G07D 7/121* (2013.01); *B42D 25/29* (2014.10); *G07D 2207/00* (2013.01)

(58) Field of Classification Search
None
See application file for complete search history.

(56) References Cited

U.S. PATENT DOCUMENTS

| | | | |
|---|---|---|---|
| 4,650,320 | A | 3/1987 | Chapman et al. |
| 8,711,339 | B2 | 4/2014 | Frankenberger et al. |

(Continued)

FOREIGN PATENT DOCUMENTS

| | | | |
|---|---|---|---|
| DE | 10259293 | A1 | 7/2004 |
| DE | 102006045624 | A1 | 4/2008 |

(Continued)

OTHER PUBLICATIONS

International Search Report with Written Opinion from PCT Application No. PCT/EP2020/025364, Nov. 20, 2020.

(Continued)

*Primary Examiner* — Edmond C Lau
*Assistant Examiner* — Chad Andrew Reverman
(74) *Attorney, Agent, or Firm* — Workman Nydegger

(57) ABSTRACT

A method for checking value documents involves the steps of: irradiating, by an excitation device, a first side of the value document with excitation radiation for exciting luminescence of a luminescent substance on the value document, such that the first side is a back side of the value document, capturing luminescence radiation which was excited by excitation of the luminescent substance at a front side of the value document by at least a part of the excitation radiation after transmission through the substrate of the value document and exits the value document at least partly at the back side of the value document after transmission through the value document, by a capture device, and checking the value document in dependence on at least one property of the captured luminescence radiation by means of an evaluation device.

25 Claims, 12 Drawing Sheets

(56) References Cited

U.S. PATENT DOCUMENTS

| | | | | |
|---|---|---|---|---|
| 10,096,193 | B2 | 10/2018 | Smith | |
| 11,263,855 | B2 * | 3/2022 | Reinhard | G07D 7/12 |
| 2002/0131618 | A1 * | 9/2002 | Ahlers | G07D 7/1205 382/101 |
| 2002/0185609 | A1 * | 12/2002 | Giering | G07D 7/1205 250/458.1 |
| 2009/0174879 | A1 | 7/2009 | Bloss et al. | |
| 2012/0293790 | A1 | 11/2012 | Frankenberger et al. | |
| 2016/0358398 | A1 | 12/2016 | Smith | |
| 2019/0236883 | A1 * | 8/2019 | Reinhard | G07D 7/005 |
| 2022/0172546 | A1 * | 6/2022 | Reinhard | G07D 7/005 |
| 2022/0277607 | A1 * | 9/2022 | Deckenbach | G07D 7/121 |
| 2023/0226841 | A1 * | 7/2023 | Geiseler | G07D 7/1205 250/362 |

FOREIGN PATENT DOCUMENTS

| | | | |
|---|---|---|---|
| DE | 102009058805 | A1 | 6/2011 |
| DE | 102014003005 | A1 | 9/2015 |
| EP | 2706511 | A1 | 3/2014 |
| EP | 3503049 | A1 | 6/2019 |

OTHER PUBLICATIONS

German Search Report from Corresponding DE Application No. 102019005656.6, Apr. 24, 2020.

* cited by examiner

METHOD AND DEVICE FOR EXAMINING VALUE DOCUMENTS

BACKGROUND

The invention relates to a method and an apparatus for checking value documents, in particular value documents containing at least one luminescent substance.

In the following, value documents are understood to be sheet-shaped objects, which present for example a monetary value or an authorization and thus shall not be manufacturable at will by unauthorized persons. They hence have security features that are not easily manufactured, in particular copied, whose presence is an indication of authenticity, i.e. of manufacture by an authorized body. Important examples of such value documents are coupons, vouchers, checks and in particular bank notes.

Luminescent substances are often used as a security feature. Luminescent substances are characterized by the fact that they exhibit luminescence when excited with suitable excitation radiation, that is, they can be excited with excitation radiation in an excitation wavelength specific to the respective luminescent substance and, as a result of the excitation, emit optical radiation with a spectrum characteristic of the respective luminescent substance, hereinafter also referred to as luminescence radiation. The spectrum of the luminescence radiation has maxima at one or more wavelengths that differ from that of the excitation radiation. Furthermore, when excited by an excitation radiation pulse, the luminescence radiation is not emitted immediately, but over a certain time with decreasing intensity, which is referred to as decay behavior. The decay behavior is also specific to the respective luminescent substance. Often, luminescent substances emit luminescence radiation with comparatively low intensity for a given intensity of excitation radiation, which makes the measurement thereof significantly more difficult.

Depending on the type of value document, luminescent substances can be incorporated as a security feature into a substrate of a respective value document of this value document type and/or applied to a surface of the substrate, for example printed. The proof of the authenticity of a value document can then be effected by checking the luminescence behavior, for example the spectral distribution and/or the decay behavior and/or of the spatial distribution of the luminescent substance in the value document. In particular, value documents of certain value document types may have, as a security feature, a luminescent substance specified for the value document type which is applied to only one side of the value document, hereinafter referred to as the front side of the value document.

Due to the very large number of value documents in circulation, for example in the case of bank notes, a machine check or automatic check of the value documents is desirable. For this purpose, the value documents can be transported past optical sensors at high speed in corresponding value document processing apparatuses, by means of which luminescence properties can be checked respectively during this transport.

When processed by machine, a value document can be transported in one of four possible orientations, depending on the feed, which result from the possible rotations around the longitudinal and transverse axis of the value document by 180°. If the value document for example has a feature on a left front side, this may appear at the top or bottom and left or right, depending on the orientation, for example when viewing the area of the value document from above.

Known sensors for luminescent substances mostly work in a remission geometry, that is, an excitation radiation source for irradiating the value document with excitation radiation and a detector for capturing luminescence radiation are disposed on the same side of the transport path for the value document or of the value document. If value documents can occur in different orientations, a check of security features applied to one side, in particular also printed luminescent features, then requires two sensors which are disposed on opposite sides of the transport path and thus of the value document. Both the provision of the sensors and the processing of the signals from the sensors require additional effort.

Though DE 102 59 293 A1 describes an apparatus for checking the authenticity of bank notes with luminescent substances applied to one side, in which the excitation radiation source and the detector are disposed on opposite sides of a transport path for value documents, the apparatus has electrical or electronic components on different sides of the transport path, which has disadvantages in terms of construction and installation and space requirements.

In general, it would be advantageous to use arrangements of excitation radiation sources and detectors that are not only suitable for checking value documents having homogeneously distributed luminescent substances, but also for checking value documents in which luminescent substances are not uniformly homogeneously distributed and/or are only applied to one side of the value document.

SUMMARY

The present invention is therefore based on the object of providing a method which allows an easy check of value documents having luminescent features applied to one side and requires components which are easy or flexible to use. Further, a corresponding apparatus for performing the method is to be provided.

The object is achieved by a first method having the features of claim 1 and, in particular, by a method for checking value documents which have a front side and a back side opposing the front side and which comprise a substrate and a specified luminescent substance applied to the substrate in at least a section of the front side of the value document, comprising the steps: irradiating, by means of an excitation device, at least a section of a first side of the value document with excitation radiation for exciting luminescence of the luminescent substance, the first side being the back side of the value document; capturing luminescence radiation which was excited by excitation of the luminescent substance at the front side of the value document by at least a part of the excitation radiation after transmission through the substrate of the value document and exits the value document at least partly at the back side of the value document after transmission through the value document or the substrate, by means of a capture device; and checking the value document in dependence on at least one property of the captured luminescence radiation by means of an evaluation device. The luminescence radiation excited by excitation of the luminescent substance at the front side of the value document by at least a part of the excitation radiation after transmission through the substrate of the value document is radiated at least partly by the luminescent substance in the direction of the back side in order to then exit at least partly from the value document at the back side of the value document after the transmission through the value document.

In principle, in the first method, the value document can be at rest in relation to the excitation device. However, it is preferred that for checking the value document, the value document is transported along a transport path and during transport at least the steps of irradiating and capturing are carried out.

The object is also achieved by a second method having the features of claim 7 and, in particular, by a method for checking value documents which have a front side and a back side opposing the front side and which comprise a substrate and a specified luminescent substance applied to the substrate in at least a section of the front side of the value document, comprising the steps: transporting the value documents individually past an excitation device which is configured to emit excitation radiation for exciting luminescence of the luminescent substance; meanwhile irradiating at least a section of a first side of a respective value document with excitation radiation by means of the excitation device, capturing at least a part of the luminescence radiation which emanates from the first side of the value document and which, when the first side is the front side of the value document, has been generated by excitation of the luminescent substance of the value document and has been emitted by the value document, or which, when the first side is the back side of the value document, has been excited by excitation of the luminescent substance of the value document by at least a part of the excitation radiation after transmission through the substrate of the value document and which exits at least partly at the first side after transmission through the substrate, by means of the capture device; and checking the value document in dependence on at least one property of the captured luminescence radiation by means of an evaluation device. The luminescence radiation excited by excitation of the luminescent substance of the value document by at least a part of the excitation radiation after transmission through the substrate of the value document is radiated at least partly by the luminescent substance in the direction of the back side in order to then exit at the first side after transmission through the substrate.

The object is further achieved by an apparatus having the features of claim 19 and in particular an apparatus for checking value documents, which have a front side and a back side opposing the front side and which comprise a substrate and a specified luminescent substance applied to the substrate in at least a section of the front side of the value document, in a capture region of the apparatus which comprises an excitation device for irradiating a first side of an individual one of the value documents in the capture region from a first side of the capture region for exciting the luminescent substance to emit luminescence radiation, a capture device for capturing luminescence radiation excited by means of the excitation radiation and emanating from the first side of the value document in the capture region in the direction of the first side of the capture region, and an evaluation device for checking the value document in dependence on at least one property of the captured luminescence radiation. In this regard the excitation device, the capture device and the evaluation device are configured for carrying out a method according to the invention, in particular according to any of claims 1 to 18. Such an apparatus according to the invention is also referred to as a checking apparatus for short in the following.

The capture region of the apparatus is understood to be a region in which at least a section of a value document must be located so that excitation radiation can be irradiated by means of the excitation device onto at least a part of the section and luminescence radiation from the section excited by the irradiation can be captured by means of the capture device.

The excitation device and the capture device, or more precisely at least the areas thereof from or into which radiation exits or enters, respectively, are disposed on the same side of the transport path and thus of the value document therein. This also allows the mentioned value documents to be checked with the same components, when they have an orientation in which the front side having the luminescent substance is irradiated directly by the excitation device.

For emitting excitation radiation suitable for exciting luminescence of the luminescent substance, the excitation device may comprise at least one radiation source, for example at least one light emitting diode and/or a laser, and optionally a filter which is substantially non-transmissive to wavelength portions unsuitable for excitation, and a collimating device focusing the radiation of the radiation source, for example at least one lens.

The capture device can be configured in dependence on the property of the luminescence radiation used for checking. For example, it may comprise a spectrometric device for capturing luminescence radiation in a spectrally resolved fashion or a device for separately capturing wavelength portions of the luminescence radiation in at least two wavelength regions. The capture device forms detection signals which represent properties of the captured luminescence radiation and delivers these to the evaluation device.

The evaluation device serves for checking the value document in dependence on at least one property of the luminescence radiation captured by the capture device and, for this purpose, can be connected to the latter via a corresponding signal connection. For checking, the evaluation device can preferably perform the step of checking according to any of the methods of the invention. For this, the evaluation device can have, for example, a processor and a memory connected to the processor, in which a program is stored, the execution of which by the processor performs the checking.

The apparatus may be configured such, in particular when the second method according to the invention is to be carried out with the apparatus, that it is configured for checking the value documents while these are individually transported along a transport path which leads through the capture region, and in particular such that the excitation device illuminates a respective one of the value documents in the transport path from the first side of the capture region, and that the capture device captures luminescence radiation which emanates from the respective value document in the capture region in the transport path in the direction of the first side. This embodiment allows a machine-based and thus efficient check of even large numbers of value documents.

Particularly preferably, the excitation device and the capture device can be disposed on the same side of the capture region and/or the transport path. These arrangements have the advantage that no active components of the apparatus need to be disposed on opposite sides of the capture region or transport path in order to be able to check the value documents in all possible orientations. Since all active members of the checking device are located on the same side of the capture region, a compact design and flexible usage of the excitation and capture device is enabled. In particular, an otherwise necessary wiring and synchronization of the excitation and capture device on both sides of the value document can be avoided. Altogether, the invention thus enables a simplified and yet reliable checking of luminescent security features applied to one side of value documents. In addition, the arrangement of the excitation and capture device also allows a checking of value documents with luminescent substances homogeneously distributed in the substrate so that the apparatus can be employed flexibly.

An object of the present invention is hence also an apparatus for processing value documents which have a front side and a back side opposing the front side and which comprise a substrate and a specified luminescent substance applied to the substrate in at least a section of the front side of the value document, with a feeding device for value documents to be processed, into which value documents are introducible and outputable therefrom in singled form, an output device in which processed value documents are depositable, a transport device for transporting value documents in singled form from the feeding device along a transport path to the output device, a control device for controlling the transport and/or the output device, and an apparatus according to the invention for checking value documents which have a front side and a back side opposing the front side and which comprise a substrate and a specified luminescent substance applied to the substrate in at least a section of the front side of the value document, wherein the apparatus for checking and the transport device are configured and disposed such that the transport path extends through the capture region of the apparatus for checking, and wherein the control device is connected to the apparatus for checking via a signal connection and is configured to control the transport device and/or the output device in dependence on results of the apparatus for checking.

The methods serve for checking value documents having a substrate and a luminescent substance applied on the substrate in at least a section of the front side of the value document, that is, value documents of a value document type whose value documents have a substrate and a luminescent substance applied on the substrate in at least a section of the front side of the value document. The value documents thus comprise a sheet-shaped substrate which has on one side on its surface in at least one section a luminescent substance specified for the value document type. This side will be referred to as the front side of the substrate in the following, the side opposing this side as the back side. The front side or back side of the value document refer to those sides of the value document that are closest to the substrate's front side or back side, respectively. The luminescent substance is to be understood as a constituent of the value document. The luminescent substance on the surface of the substrate can preferably be applied there, for example by printing or other forms of attachment or application. The luminescent substance may be present as a layer on the surface or contained in a layer on the surface. The layer does not have to form the uppermost layer of the value document and/or be applied directly to the substrate.

The luminescent substance may comprise one or more components and is preferably specified by a value document type of the value document. The value document type of a value document here may be given at least by the currency and/or the nominal value and/or, where applicable, the issue. Authentic value documents of this value document type must then have the luminescent substance in at least one section of the front side of the value document. Particularly preferably, the luminescent substance can emit luminescence radiation in the infrared and/or visual spectral region when excited by the excitation radiation. The value document type may additionally have other properties, for example a print on the front side and/or back side of the value document or the presence of a security thread or the like.

It has been found that luminescence can be excited on the front side of the value document, when it is illuminated from the back side, and that at least a part of the luminescence radiation excited on the front side can be detected on the back side after propagating to the back side and exiting the value document, and can be used for checking.

The substrate of the value document is at least partially transmissive to the excitation radiation, at least in the region of the luminescent substance applied to the surface. Preferably, the transmissivity of the substrate of the value document to the excitation radiation is at least 10%, preferably at least 15%, particularly preferably at least 25%. In this regard, for an effective transport of the excitation radiation through the substrate of the value document, a directional transmission is not necessarily required, rather the radiation transport can also be effected diffusively and thus non-directionally due to corresponding scattering contributions. Accordingly, the stated transmission values refer to measurements which capture the transmitted excitation radiation integrally over all exit angles.

Luminescence radiation that has been excited at the front side and propagates in the substrate toward the back side can reach the back side, exit there and then be captured. The substrate is at least partially transmissive also to the luminescence radiation, at least in the region of the luminescent substance applied to the surface. Preferably, the transmission for the luminescence radiation is at least 10%, more preferably at least 15%, particularly preferably at least 25%.

Preferably, the substrate is at least partially transmissive to optical radiation in at least one wavelength region in the infrared (IR) and/or visual (VIS) region. The wavelength regions comprise at least the wavelength of the excitation radiation and the spectrum of the luminescence radiation generated by the luminescent substance.

Preferably, the substrate comprises at least one polymer layer, in particular of polypropylene. In the case of pure polymer substrates, the substrate may have at least one further layer beneath the luminescent substance, for example an ink-receiving layer or other layer. These layers are considered to be components of the substrate in the context of the present application.

In other embodiments, the value document may also comprise a so-called hybrid substrate which comprises at least one polymer layer and at least one paper layer connected to the polymer layer.

In the methods, preferably only one checking apparatus is used for checking the luminescence, in which the excitation device and the capture device or, more precisely, their radiation exit or entrance areas are disposed on the same side of the capture region. In the apparatus, for this the excitation device and the capture device, or more precisely, their radiation exit or entrance areas are preferably disposed on the same side of the capture region. A second apparatus is not necessary. In particular, it is possible that the checking apparatus does not have another radiation source for emitting excitation radiation on that side of the capture region which faces away from the excitation device.

If the value document is transported past the excitation device and the capture device for checking, a distance in the apparatus between the transport plane in which the value document is transported and the capture device can preferably be greater than 4 mm, particularly preferably greater than 9 mm. In the method, it is preferred that upon capture of the at least one part of luminescence radiation by means of the capture device, the distance between the value document and the capture device is greater than 4 mm, particularly preferably greater than 9 mm. This has the advantage that a contact between the value document, in particular the transported value document, and the nearest element of the capture device, for example a window or a lens or another optical element, and thus a soiling or damage can be avoided.

In the methods, the value document is checked in dependence on at least one property of the captured luminescence radiation. Thus, upon checking, at least one property of the captured luminescence radiation is used. Preferably, a spectral property of the captured luminescence radiation or a time behavior of the luminescence radiation, for example a decay behavior, can be checked as a property. In particular the intensity at a specified wavelength or in a narrow wavelength region or the intensity at at least two different wavelengths or wavelength regions can be used as a spectral property. In particular when the value document is irradiated with excitation radiation during transport and the resulting luminescence radiation is captured at least partly, a spatial distribution of the luminescence and thus of the luminescent substance can be used as a property. Particularly preferably, a combination of at least two of the mentioned properties is used. Depending on the type of capture device and the type of check, the property may be given solely by a property of the detection signal of the capture device, for example its level, or it may be ascertained by further evaluation of the detection signal in the evaluation device.

In the methods, it may be preferred that upon checking it is checked whether the captured luminescence radiation represents an indication of the presence of the luminescent substance at the front side of the value document. Such an indication may be used as an indication of the authenticity of the value document or its type. The evaluation device of the apparatus can then preferably be configured that upon checking it is checked whether the captured luminescence radiation is an indication of the presence of the luminescent substance at the front side of the value document. At the end of the check, the evaluation device of the apparatus can preferably form or emit an indication signal, which represents whether the check has resulted in the indication or not. This indication signal can then be further used in a value document processing apparatus, for example for sorting.

In the second method, it may be preferred that in the method the checking is carried out such that the result of the checking is independent of whether the first side of the value document is the front side of the value document or the back side. In the apparatus, the evaluation device can be configured such that the checking is carried out such that the result of the checking is independent of whether the first side of the value document is the front side of the value document or the back side. This allows a simple check with very simple means, in particular a previous sorting with regard to orientation is not necessary for checking value documents.

In this embodiment, upon checking, an intensity of the captured luminescence radiation can preferably be compared with a reference value which is independent of whether the front side is the first side or not. If the intensity of the captured luminescence radiation exceeds the reference value, this is considered an indication of the presence of the luminescent substance.

In particular, the reference value can be specified such that with the checking apparatus or a checking device configured in the same way, where applicable except for the evaluation device, one or more reference value documents, for example authentic reference value documents, of the same value document type as the one or more value document(s) to be examined are examined. The one or more reference value document(s) therefore also have a front side and a back side opposing the front side. They further comprise the substrate and the specified luminescent substance applied to the substrate in at least one section of the front side of the value document. For this or these reference value documents, the property of the luminescence radiation is then ascertained, which is emitted by the luminescent substance when the back side of the value document is irradiated with excitation radiation and emanates from the back side. For the most recently described embodiment, a corresponding capture is carried out as well for the reference document(s), in which, however, the front side is directly irradiated with excitation radiation. If the property is the intensity of the luminescence radiation, the reference value can be established such that it is below the intensity of the luminescence radiation captured for the reference value documents upon irradiation of the back side.

Alternatively, in the second method, it may be preferred to use at least two check criteria upon checking, a first one of which is a criterion that the first side is the front side of the value document and the second check criterion is a criterion that the first side is the back side of the value document. In the apparatus, in this regard the evaluation device can be configured to use at least two check criteria upon checking, a first one of which is a criterion that the first side is the front side of the value document and the second check criterion is a criterion that the first side is the back side of the value document. This procedure has the advantage that different and thus more precise criteria can be used for the presence of the luminescent substance on the first side and the second side, respectively, so that the check becomes more accurate. In particular, the check criteria may use different reference values with which the property of the captured luminescence radiation, for example the intensity thereof, is compared. If the front side of the value document and thus the luminescent substance is directly irradiated with excitation radiation, for example a stronger luminescence radiation may result than with an irradiation after the passage through the substrate and subsequent passage of the excited luminescence radiation through the substrate, whereby in general a weakening due to the substrate occurs.

Preferably, in the method, in particular in the last described embodiment, upon checking it is also ascertained whether the first side is the front side or the back side. Then, a signal can be formed and emitted that represents whether the first side is the front side or the back side of the value document. This result can be compared in a value document processing apparatus with other check results from which the orientation of the value document can be concluded. In the apparatus, for this, the evaluation device is preferably configured to ascertain upon checking whether the first side is the front side or the back side. Then, a signal can be formed and emitted that represents whether the first side is the front side or the back side of the value document. For this purpose, the apparatus can preferably have an interface via which the mentioned signal can be emitted. This interface can also be used for transmitting other signals.

Another preferred embodiment of the method further comprises capturing an orientation of the value document, the orientation rendering whether the first side of the value document is the front side or the back side. In the method, the checking can then preferably be carried out in dependence on the captured orientation of the value document. The capture of the orientation only needs to consist of the capture of corresponding information provided by another device. The value document processing apparatus can then have a device for ascertaining the orientation, by means of which an orientation of the value document is ascertainable, the orientation rendering whether the first side of the value document is the front side or the back side, and which emits an orientation signal to the checking apparatus, more precisely the evaluation device thereof, which renders the orientation of the value document. The device for ascertaining the orientation can for example have an image sensor operating in the visible wavelength region, by means of which a remission or transmission image of at least a section of the value document can be captured. In the checking apparatus, the evaluation device can then preferably have an interface by means of which it can obtain at least one signal which renders the orientation of the value document, the orientation rendering whether the first side of the value document is the front side or the back side, and be further configured to carry out the checking in dependence on the orientation of the value document. This embodiment allows a very precise check, since the expected properties of the captured luminescence radiation depend on the orientation of the value document and the check can be carried out differently for the possible orientations. For example, reference values for the intensity of the captured luminescence radiation could be specified in dependence on the orientation of the value document.

Preferably, the first method further comprises reflecting a part of the excitation radiation, which after transmission through the value document has exited on the front side of the value document, at least partly back onto the value document, and exciting, by the reflected part, the luminescent substance to emit luminescence radiation. In the first method, upon capturing, at least a part of the luminescence radiation excited by the reflected part of the excitation radiation can then also be captured after transmission to the back side of the value document and exit from the value document.

Accordingly, in a preferred embodiment, the second method comprises reflecting a part of the excitation radiation, which has exited after transmission through the value document on a second side of the value document opposing the first side, at least partly back onto the value document and exciting, by the reflected part, the luminescent substance to emit luminescence radiation. In the second method, upon capture, at least a part of the luminescence radiation excited by the reflected part of the excitation radiation, which emanates from the first side of the value document, can then also be captured. Thus, if the second side of the value document is the front side of the value document, the luminescence radiation is excited at the front side; a part of it is emitted into the value document and passes through the substrate to the first side, i.e. the back side, where it exits the value document at least partly and thus emanates from the first side. If, on the other hand, the second side of the value document is the back side of the value document, the reflected part of the excitation radiation penetrates at least partly the substrate and excites luminescence radiation at the front side of the value document, the first side. A part of this luminescence radiation is emitted into the half-space in front of the front side, thus also emanates from the first side of the value document.

These embodiments of the first and second method have the advantage that excitation radiation that has passed through the value document without having excited luminescence is directed at least partly back onto the value document and can generate additional luminescence radiation that can be captured together with the luminescence radiation excited by non-reflected excitation radiation. In this way, with an excitation radiation of the same intensity significantly more or stronger luminescence radiation is captured, which increases the accuracy of the check. Upon capture, the luminescence radiation excited by the reflected portion of the excitation radiation is not separated from the portion of the luminescence radiation generated by the non-reflected portion of the excitation radiation, so that the captured luminescence radiation comprises both the luminescence radiation generated by the non-reflected excitation radiation and the luminescence radiation generated by the reflected excitation radiation. This or their at least one property is used for checking.

Preferably, in the method the excitation radiation is reflected with a reflectance of more than 50%, particularly preferably of more than 90%.

Alternatively or additionally, in the first method it is preferred that it further comprises reflecting luminescence radiation, which was generated by excitation of the luminescent substance on the front side of the value document by means of the excitation radiation and emitted on the front side of the value document, at least partly back onto the value document. In the first method, upon capture, the reflected luminescence radiation is then preferably also captured at least partly after transmission to the back side of the value document and exit from the value document.

Accordingly, in the second method it is preferred that it comprises reflecting luminescence radiation, which is generated by excitation of the luminescent substance on the front side of the value document by means of the excitation radiation and emanates from a second side of the value document opposing the first side, at least partly back onto the value document. Further, in the second method, upon capture, the reflected luminescence radiation is also captured at least partly after transmission to the first side of the value document and exit from the value document on the first side.

In these embodiments or developments of the first or second method as well, the reflected luminescence radiation cannot be separated from the non-reflected luminescence radiation upon capture. Therefore, the captured luminescence radiation comprises both the non-reflected luminescence radiation and the reflected luminescence radiation. This or their at least one property is used for checking.

Preferably, in the method the luminescence radiation is reflected back with a reflectance of more than 50%, particularly preferably of more than 90%.

These embodiments have the advantage that portions of the luminescence radiation, which is in principle non-directional, which would otherwise leave the capture region in the direction of the second side of the capture region and not be captured, can be captured at least partly after transmission through the value document. The captured luminescence radiation is therefore stronger compared to an arrangement without a reflection device, which increases the accuracy of the capture and thus also the check.

For these embodiments of the methods, the apparatus may further have a reflection device which reflects excitation radiation emanating from a second side of the value document opposing the first side and/or luminescence radiation emanating from a second side of the value document opposing the first side back into the capture region or onto the value document therein. Therefore, also in this embodiment, the apparatus has electrical elements only on the same side of the capture region, on the other side there is only the reflection apparatus, which does not require any electrical control or signal connection. In the apparatus, the reflection device preferably has a reflectance of more than 90% for the excitation radiation or the luminescence radiation.

Particularly strong luminescence radiation is obtained when in the methods and in the apparatus both excitation radiation and luminescence radiation are reflected. This design has the further advantage that the reflection device only needs to be suitably configured, for which particularly preferably no additional components are necessary.

Preferably, the reflection device is arranged to reflect the at least one part of the excitation radiation exiting at the front side of the substrate and/or the at least one part of the luminescence radiation emitted by the luminescent substance in the direction of the reflection device directionally and/or diffusely, in particular isotropically. Accordingly, in the methods, preferably the at least one part of the excitation radiation exiting at the front side of the substrate and/or the at least one part of the luminescence radiation emitted by the luminescent substance is reflected directionally and/or diffusely, in particular isotropically. Thus, the excitation radiation and/or the luminescence radiation, which exits in the region of the capture device on the front side of the substrate and/or of the value document and would thus be lost, is reflected back in the direction of the capture device.

Preferably, the reflection device is spaced apart from the capture region. Preferably, the distance between the reflection device and the capture region, particularly preferably the transport path, is between 1 and 20 mm, in particular between 3 and 12 mm, in particular about 10 mm. This avoids contact between the reflection device and the value documents or the transport device, which could lead to mechanical damage to the value documents, the transport device and/or the reflection device.

Preferably, in the method, the excitation radiation and/or luminescence radiation upon the reflection can also be focused at least approximately onto the transported value documents. In the apparatus, for this, the reflection device can preferably be configured to focus the reflected excitation radiation and/or luminescence radiation into the capture region. Preferably, a focal plane or a focal point of the reflection device is less than 2 mm above and less than 2 mm below a transport plane along which the value documents are transported. This embodiment has the advantage that the reflected excitation radiation can excite more luminescence radiation in the value document due to the at least approximate focusing on the value document or the capture region, or that the luminescence radiation focused at least approximately in the value document can be captured better, in particular by means of the capture device.

Preferably, the reflection device has at least one cylindrical concave mirror and/or at least one reflectively coated convex, in particular plano-convex, cylindrical lens, which have a reflective area whose focal line lies in a measuring plane of the capture device and/or near the front side and/or at the front side of the value document conveyed in particular by the transport device. Preferably, the distance between the focal line and the measuring plane and/or the front side of the value document is less than 20% of the focal length of the reflection device, in particular less than 2 mm. The cylinder concave mirror is preferably positioned such that the cylinder axis lies approximately in the measuring plane of the checking device. In the case of the cylindrical lens, preferably exactly the curved side of the cylindrical lens is coated reflectively. In both variants, the scattered light and/or the luminescence radiation which arises near the focal line is/are reflected back approximately into the focal line by the mirror or the coated lens surface. A particular advantage of using a plano-convex lens with a reflectively coated curved side, compared to the cylindrical concave mirror, is that toward the bank note transport plane a planar area is present which is robust against bank note abrasion and can be easily cleaned.

Alternatively or additionally, the reflection device has at least one Fresnel cylindrical concave mirror and/or at least one reflectively coated Fresnel cylindrical lens which has/have two or more reflective areas which have different radii of curvature and whose focal lines lie in a measuring plane of the capture device and/or near the front side and/or at the front side of the value document conveyed in particular by the transport device. In the case of a Fresnel cylindrical concave mirror with several cylinder areas with different radii, these are positioned such that a common focal line results which lies in the measuring plane. Preferably, the distance between the focal line and the measuring plane and/or the front side of the value document is less than 20% of the focal length of the reflection device, in particular less than 2 mm. The scattered excitation light and/or the luminescence radiation which arises near the focal line is reflected back to the focal line by the individual mirrors in a significantly greater angle region than is the case with one single cylindrical concave mirror. Analogously, in a Fresnel cylindrical lens, several cylindrical lenses with different radii are combined so that a Fresnel cylindrical lens arises whose curved sides are reflectively coated and which has one single focal line that lies in the measuring plane. A particular advantage of using a plano-convex Fresnel cylindrical lens, compared to Fresnel cylindrical concave mirror, is that toward the bank note transport plane a planar area is given which is robust against bank note abrasion and can be easily cleaned. The Fresnel arrangement allows greater angle regions to be reflected back than is the case with a simple cylindrical lens.

It can be advantageously provided that the reflecting area or at least one of the reflecting areas has two ends in the direction of the respective cylinder axis and the reflecting area or at least one of the reflecting areas is curved concavely, in particular spherically or aspherically, in the region of at least one of the two ends toward the cylinder axis and/or a plane mirror is provided, in particular perpendicular to the cylinder axis, in the region of at least one of the two ends of the reflecting area or of the at least one reflecting area. By concavely configured ends of the reflecting cylinder area an edge falloff of the cylinder reflection in the region of the ends is reduced, so that the excitation radiation or luminescence radiation is efficiently reflected toward the value document or sensor, which results in an accordingly higher intensity of the captured luminescence radiation. Plane mirrors can “fold back” a part of the scattered radiation, which would be reflected by the concave mirror(s) into a region which is outside the capture region of the capture device, into the capture region and thereby also reduce the edge falloff and increase the intensity of the captured luminescence radiation. Compared to concavely configured ends, plane mirrors are easier and cheaper to manufacture.

Alternatively or additionally, the reflection device can have at least one spherical concave mirror and/or at least one reflectively coated spherical convex lens, in particular a plano-convex lens, which has or have a reflective area whose focal point lies in a measuring plane of the capture device and/or near the front side and/or at the front side of the value document conveyed in particular by the transport device. In one design, the distance between the focal point and the measuring plane and/or the front side of the value document is less than 20% of the focal length of the reflection device, in particular less than 2 mm.

Alternatively or additionally, the reflection device may have at least one spherical Fresnel concave mirror and/or at least one reflectively coated spherical Fresnel lens, which has/have two or more reflecting areas which have different radii of curvature and which are positioned such that a common focal point results which lies in a measuring plane of the capture device and/or near the front side and/or at the front side of the value document conveyed in particular by the transport device. Preferably, the distance between the focal point and the measuring plane and/or the front side of the value document is less than 20% of the focal length of the reflection device, in particular less than 2 mm.

In the aforementioned variants with spherical (Fresnel) reflectors, the scattered light and/or luminescence radiation that arise/s near the focal point of a reflector is reflected back by the reflector approximately to the point of origin. A particular advantage of using a coated plano-convex lens over a concave mirror is that a planar area is given toward the bank note transport plane, which is robust against bank note abrasion and can be easily cleaned. A Fresnel arrangement allows greater angle regions to be reflected back. In one design, with this reflection, the reflection cannot effect an exact reproduction at the point of origin due to the scattering effect of the substrate of the value document. However, upon checking a substrate having a low scattering effect, for example made of a polymer substrate, an approximately exact reproduction may in fact be possible.

The aforementioned variants with spherical (Fresnel) reflectors are preferably employed when the irradiation is not an at least approximately line-shaped illumination or irradiation of the value document by the irradiation device, but rather individual tracks on the value document are irradiated with finite, in particular distinct, distances between them. In these cases, analogous to the variants described above with cylinder-shaped reflectors or Fresnel reflectors, the excitation radiation or luminescence radiation is reflected with respectively one single spherical reflector per track toward the value document or in the direction of the detector located behind the value document. For this purpose, the reflection device has a plurality of spherical reflectors which are disposed mutually offset along a direction perpendicular to the transport direction of the value document, each spherical reflector being formed by a spherical concave mirror, a reflectively coated spherical convex lens, a spherical Fresnel concave mirror or a reflectively coated spherical Fresnel lens.

Alternatively or additionally, the reflection device can have at least one retroreflector which is arranged to reflect the incident excitation radiation and/or luminescence radiation, largely independently of the direction of incidence and the orientation of the reflector, for the most part in the direction from which it came, i.e. toward the value document or the luminescent security feature. The retroreflector here can preferably comprise a plurality of respectively three plane mirrors disposed in pairs perpendicular to each other ("cat's eye") or alternatively a multiplicity of small, transparent beads made of glass or polymer. In a particularly preferred embodiment, the multiplicity of transparent beads are additionally coated in a reflective metallic manner on the back side.

Preferably, the transport device is arranged to convey the value document in a transport direction relative to the irradiation device, and the reflection device is disposed offset with respect to the irradiation device, in particular an illumination optic of the irradiation device, against the transport direction. In this embodiment, the reflecting area of the reflection device, e.g. of the cylindrical and/or spherical and/or Fresnel mirror, is disposed slightly offset against the transport direction with respect to the illumination optic. This effects that the excitation radiation mirrored back is offset by twice the amount. The luminescences excited by this mirrored radiation may contribute longer to the capture signal, as they have to be transported farther until they have left the capture region of the capture device. In addition to an increase in the intensity of the captured luminescence radiation on fast-running machines (with transport speeds of e.g. >3 m/s or >5 m/s or >7 m/s), such an arrangement with offset increases the selectivity with which slow and fast decay time constants of the luminescence can be distinguished, since in particular luminescence radiation with a slow decay time is transported out of the capture region of the checking apparatus to a considerable extent and is reflected back into the capture region by the reflector with offset. This enables a more accurate authenticity check, as typical luminescent feature substances have longer decay times than possible interfering background fluorescences.

Alternatively or in addition to the offset, the reflection device, such as the cylindrical or spherical mirror, can also be tilted in its orientation to the perpendicular of the transport plane.

With the invention, it is now possible to check a value document having a luminescent feature without the need for sensors on two sides, each of which checks for remission and/or transmission. Thus, in comparison with the prior art, a simple structure of an apparatus for checking a value document and an apparatus for processing value documents is made possible. In particular, not only the direct structure is simplified here, but also the control, evaluation and wiring of the excitation and capture device, since instead of at least two devices for checking for remission and transmission, merely one apparatus is necessary. In addition, due to the arrangement of excitation device and capture device on the same side which is directed toward the value document to be checked, an arrangement optimized as to installation space is possible. Furthermore, due to the optimized arrangement and low requirement of components, the energy consumption and maintenance effort is reduced.

Furthermore, it is now possible to adjust the distances to transport elements, in particular to a value document transport plane, accurately and securely during the adaptation. Furthermore, due to the arrangement of the apparatus for checking on only one side of the value document transport plane, it is possible that no position coordination between the excitation device and the capture device is needed, as these two components can already be provided as substantially one assembly.

Furthermore, the invention enables a simpler synchronization between the capture device and the excitation device compared to the prior art having several capture and excitation devices, and thus the capture device and excitation device do not excite or capture at the same time, for example.

BRIEF DESCRIPTION OF THE DRAWINGS

Further advantages, features and application possibilities of the present invention will result from the subsequent description in connection with the Figures. There are shown.

DETAILED DESCRIPTION OF VARIOUS EMBODIMENTS

Figure 1:
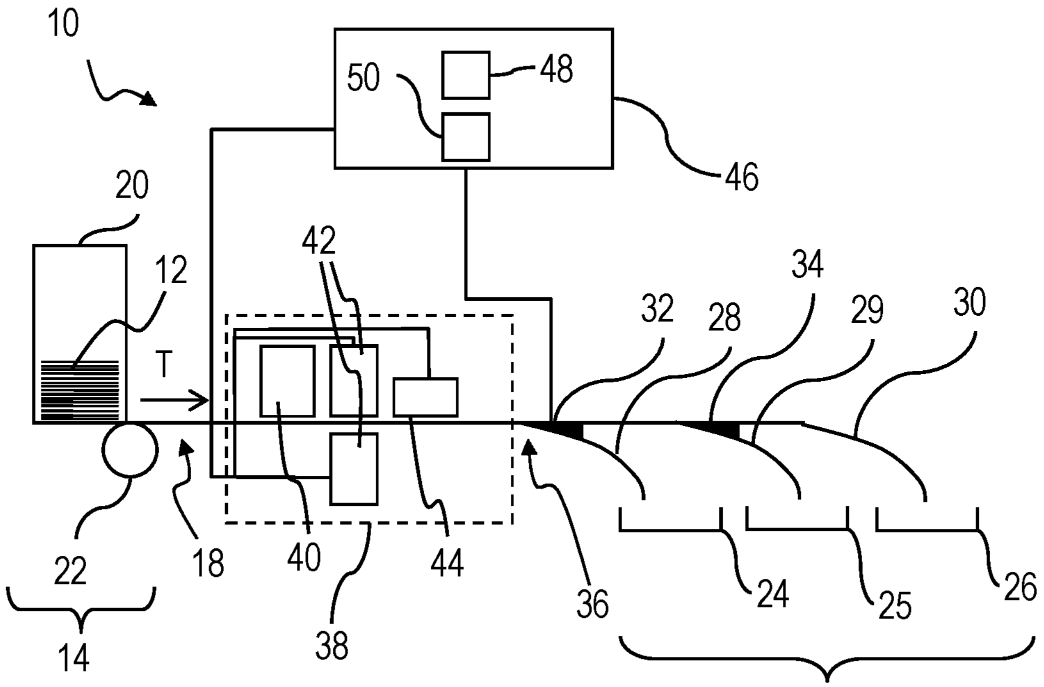
FIG. 1 a schematic view of an embodiment example of a value document processing apparatus.

A value document processing apparatus 10 in FIG. 1, in the example an apparatus for processing value documents 12 in the form of bank notes, is configured for sorting value documents in dependence on the authenticity of processed value documents checked by means of the value document processing apparatus 10.

It has a feeding device 14 for feeding value documents, an output device 16 for accepting processed, i.e. sorted, value documents, and a transport device 18 for transporting singled value documents from the feeding device 14 to the output device 16.

The feeding device 14 comprises in the example an input pocket 20 for a value document stack and a singler 22 for singling value documents out of the value document stack in the input pocket 20 and for providing or feeding them to the transport device 18. Value documents are fed to the transport device 18 in the same orientation as they have assumed in the input pocket 20, that is, without changing their orientation, for example without turning or rotating.

The output device 16 comprises in the example three output sections 24, 25 and 26 into which processed value documents can be sorted depending on the result of the processing, in the example a check. In the example, each of the sections comprises a stack pocket and a stacking wheel not shown by means of which fed value documents can be deposited in the stack pocket.

The transport device 18 has at least two, in the example three, branches 28, 29 and 30 at whose ends one of the output sections 24 or 25 or 26 is respectively disposed, and, at the branching points, gates 32 and 34 controllable by actuating signals, by means of which value documents are feedable to the branches 28 to 30 and thus to the output sections 24 to 26 in dependence on actuating signals.

On a transport path 36, defined by the transport device 18, between the feeding device 14, in the example more precisely the singler 22, and the first gate 32 after the singler 22 in the transport direction T, there is disposed a sensor device 38 which captures properties of the value documents while the value documents are being transported past and forms sensor signals rendering the properties, which represent the properties. In this example, the sensor device 38 has an optical remission sensor 40 which captures a remission color image of the value document, an optical transmission sensor 42 which captures a transmission image of the value document, and a checking device 44 for checking luminescence properties of value documents of a specified value document type.

A machine control and evaluation device 46 is connected via signal connections to the sensor device 38 and the transport device 18, in particular the gates 32 and 34. In connection with the sensor device 38 it classifies a value document in dependence on the signals of the sensor device 38 for the value document into one of several specified sorting classes. These sorting classes can be specified in dependence on an authenticity value ascertained by means of the sensor data. In other embodiment examples, the sorting class can also be ascertained in dependence on a state value for a respective value document ascertained by means of the sensor data, for example.

In the example, as authenticity values there can be used the values “forged”, “suspect” or “authentic”. In dependence on the ascertained sorting class, the machine control and evaluation device 46 controls the transport device 18, here more precisely the gates 32 or 34, by emitting actuating signals such that the value document is outputted in accordance with its sorting class ascertained upon the classification into an output section of the output device 16, said section being associated with the class. The association with one of the specified sorting classes or the classification is effected here in dependence on criteria specified for the judgement of the authenticity, which criteria depend on at least a part of the sensor data.

The machine control and evaluation device 46 has for this purpose in particular, besides corresponding interfaces for the sensor device 38 or the sensors thereof and the checking device 44, a processor 48 and a memory 50 connected with the processor 48, in which memory at least one computer program with program code is stored, upon whose execution the processor 48 controls the apparatus, in particular evaluates the sensor signals of the sensor device 38, in particular for ascertaining a sorting class of a processed value document, and controls the transport device 18 in accordance with the evaluation.

The machine control and evaluation device 46 ascertains from the sensor signals of the sensor device 38 in a sensor signal evaluation at least one value document property which is relevant for checking the bank notes with respect to their authenticity. Preferably, several of these properties are ascertained. In this example, a transmission image and a remission image are ascertained as optical value document properties, and by means of the checking apparatus 44 the presence of a specified luminescence property are ascertained as a further property.

In dependence on the value document properties, the machine control and evaluation device 46 ascertains sorting signals for each of the various sensors or the checking apparatus, which represent whether or not the ascertained value document properties represent an indication of the authenticity of the value document. In consequence of these signals, corresponding data can be stored in the machine control and evaluation device 46, for example the memory 50, for a later use. In dependence on the sorting signals, the machine control and evaluation device 46 then ascertains an overall result for the check according to a specified overall criterion, and forms the sorting or control signal for the transport device 18 in dependence on the result.

For processing value documents 12, value documents 12 inserted into the input pocket 20 as a stack or singly are singled by the singler 22 and fed in singled form to the transport device 18, which transports the singled value documents 12 past the sensor device 38. The latter captures the properties of the value documents 12, sensor signals being formed which represent the properties of the respective value document. The machine control and evaluation device 46 captures the sensor signals, ascertains in dependence thereon a sorting class, in the example an authenticity class, of the respective value document, and controls the gates in dependence on the result such that the value documents are transported in accordance with the ascertained sorting class into an output section associated with the respective sorting class.

In the present example, value documents 12 of a value document type are checked in which the value documents 12 have a front side 72 and a back side 75 opposing the front side (cf. FIG. 3) and comprise a substrate 70 and a specified luminescent substance 73 applied to the substrate 70 in at least one section of the front side 72 of the value document 12 (cf. FIGS. 3A to 3D). In particular, it is checked whether a respective value document has a specified luminescent substance applied in particular on a substrate 70 of the value document in at least one section of the front side 72 of the value document.

Figure 2:
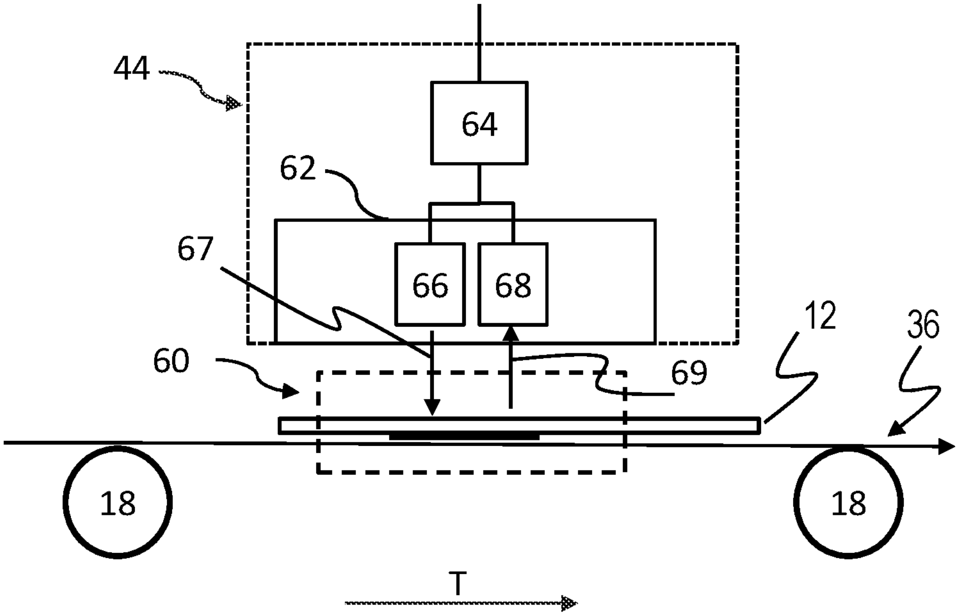
FIG. 2 a schematic diagram of an example of a checking apparatus of the value document processing apparatus in FIG. 1, in a side view transverse to a transport direction and in a sheet plane of a value document, FIGS. 3A to 3D schematic side views of a value document with a luminescent substance applied to one side, in different orientations relative to an excitation device and a capture device of the checking apparatus in FIG. 2, FIG. 4 a schematic flow chart of a first example of a method for checking a value document with a luminescent substance applied to only one side, FIG. 5 a schematic flow chart of another example of a method for checking a value document with a luminescent substance applied to only one side.

For ascertaining a sorting class on the basis of this property of a respective value document, there serves the checking apparatus 44 for examining a value document, which in the example is structured as follows (cf. FIG. 2).

The checking apparatus 44 has a capture region 60 in which a value document must be located in order to be checked with the checking apparatus. The transport path 36 leads through this capture region. The checking apparatus 44 has a sensor part 62 and an evaluation device 64. The sensor part 62 comprises an excitation device 66 for irradiating a first side of a single one of the value documents in the capture region 60 from a first side of the capture region with excitation radiation 67 which serves for exciting the luminescent substance to emit luminescence radiation, and a capture device 68 for capturing luminescence radiation 69 excited by means of the excitation radiation and emitted from the first side of the value document 12 in the capture region 60 in the direction of the first side of the capture region 60. The arrangement and the properties of the sensor part 62, and more precisely of the excitation device 66 and the capture device 68, determine the extent and orientation of the capture region. In the present example, the checking device 44 is configured and disposed such that the transport path 36 extends through the capture region 60. If in the following a first side of the capture region or a first side of a value document or substrate is mentioned, this refers to the side facing the excitation device 66 or the sensor part 62. The sensor part 62 is therefore located on the first side of the capture region 60.

In this embodiment example, the excitation device 66 is configured to emit excitation radiation 67 in the infrared spectral range into the capture region 60. In particular, the excitation radiation 67 comprises infrared excitation radiation suitable for exciting luminescence of the luminescent substance of the specified value document or value documents of the specified value document type. Although it is sufficient that an exit area, via which the excitation device 66 emits the excitation radiation 67 into the capture region 60, is disposed on one side of the capture region 60, in this example the excitation device 66 as a whole is arranged on one side of the capture region 60.

In the example, the excitation device 66 of the sensor part 62 generates a line-shaped distribution of the excitation radiation 67 on the value document 12 or substrate 70. The line preferably extends transverse to the transport direction. In other embodiment examples, however, a different irradiation pattern may be used.

The capture device 68 is disposed on the same side of the capture region 60 and thus of the transport path 36 as the excitation device 66. However, in other embodiment examples, it may be sufficient that only an entrance area for luminescence radiation, which emanates from a value document in the capture region 60, is disposed on the same side of the capture region 60 as the exit area of the excitation device. In particular, the capture device 68 is adapted to capture luminescence radiation 69 emanating from a value document 12 in the capture region 60, which luminescence radiation has been generated by irradiating the value document 12 with excitation radiation 67 of the excitation device 66 and emanates from the value document 12. It then generates detection signals that represent properties of the luminescence radiation, in the example the intensity of the captured luminescence radiation.

The capture device 68 preferably has several detection elements corresponding to the excitation device 66 and, where applicable, an optical device, which are configured and disposed such that the detection elements can respectively capture the excited luminescence radiation from a section of the capture region 60 associated with the respective detection element and corresponding detection signals are formed. The optical device has filters that suppress optical radiation from a wavelength region in which the luminescence radiation does not occur. These sections are disposed along a line transverse to the transport direction T.

The working distance between the sensor part 62 or the capture device 68 and the value document 12 in the transport path 36 is preferably between 3 and 12 mm, in the example the distance is about 10 mm. In other embodiment examples, however, smaller or greater distances may be provided.

The distance between the capture device 68 and the value document 12 in the transport path or the transport plane is preferably greater than 4 mm.

The checking apparatus 44 further has the evaluation device 64 for checking the value document 12 in dependence on at least one property of the captured luminescence radiation 69 which was captured by means of the capture device 68. Furthermore, in this embodiment example, it serves to control the excitation device 66 and the capture device 68. For performing the checking, the evaluation device 64 has a processor, a memory connected to the processor and at least one interface for exchanging signals and/or data with the excitation device 66, the capture device 68 and the machine control and evaluation device 46. FIG. 3 shows only one interface for the excitation device and the capture device and one interface for the machine control and evaluation device. In other embodiment examples, the interface for the excitation device and the capture device may also be replaced by two separate interfaces for the excitation device and the capture device. The memory of the evaluation device 64 further stores a computer program, upon whose execution by the processor the evaluation device executes at least parts of a method for checking value documents described hereinafter.

For this, the excitation device 66, the capture device 68 and the evaluation device 64 are connected to each other via signal connections, so that the evaluation device 64 can capture the detection signals of the capture device 68, optionally control the excitation device 66, and evaluate the captured detection signals or use them to check the value document.

The checking apparatus 44 is configured to check value documents of the specified value document type with respect to their luminescence.

Figure 3A:
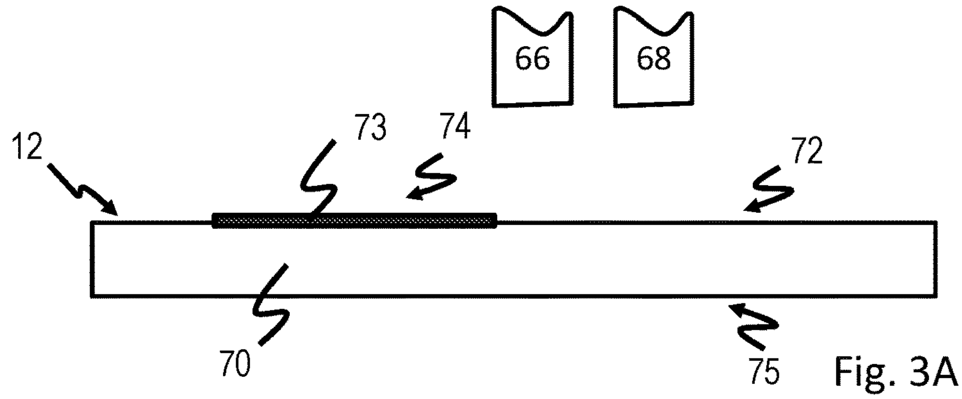

A value document 12 of the specified value document type shown schematically and not true to scale in FIG. 3*a* in a sectional view perpendicular to the area of the value document has a substrate 70, in the present example a polymer substrate containing polypropylene with an ink-receiving layer present thereon, and a luminescent substance 73 specified for the value document type and applied, in the example printed on, to a front side 72 of the substrate 70 on a section of the surface of the substrate. The section with the luminescent substance forms a security feature or luminescent feature 74.

The luminescent substance(s) used for the luminescent feature may be organic, metalorganic and/or inorganic luminescent substances. Luminescence features in which both the excitation and the emission are in the IR region are particularly suitable, since here particularly low scattering losses in the substrate and thus particularly high intensities can be expected in the backside measurement through the substrate.

With increasing wavelength, the detection of luminescence radiation can become technically more complex (e.g. due to more complex or expensive detectors, increased background noise), and substrate-specific absorptions can occur, which favor or disadvantage certain wavelength regions in particular in cellulose-based substrates. In a preferred embodiment, the luminescence radiation of the luminescence feature is therefore in the region between 750 nm and 1600 nm. Here, a good compromise between easy detectability and scattering losses is achieved. On the other hand, using a security feature with a luminescence wavelength whose detection is technically complex, in particular a wavelength above 1100 nm, can increase the forgery resistance of the value document, since for a possible forger it is difficult to detect the luminescence radiation of the security feature.

Examples of such luminescent substances are doped inorganic pigments with the dopants neodymium or ytterbium or erbium or thulium or holmium or other rare earths or combinations thereof, or doped with certain transition metals. Further preferred are metalorganic complexes with neodymium or ytterbium or erbium or thulium or holmium or certain organic dyes.

Suitable inorganic matrices are, for example:

oxides, in particular 3- and 4-valent oxides such as titanium oxide, aluminum oxide, iron oxide, boron oxide, yttrium oxide, cerium oxide, zirconium oxide, bismuth oxide, as well as more complex oxides such as garnets, including, inter alia, e.g. yttrium iron garnets, yttrium aluminum garnets, gadolinium gallium garnets; perovskites, including, inter alia, yttrium aluminum perovskite, lanthanum gallium perovskite; spinels, including, inter alia, zinc aluminum spinels, magnesium aluminum spinels, manganese iron spinels; or mixed oxides such as ITO (indium tin oxide);

oxyhalides and oxychalcogenides, in particular oxychlorides such as yttrium oxychloride, lanthanum oxychloride; as well as oxysulfides, such as yttrium oxysulfide, gadolinium oxysulfide;

sulphides and other chalcogenides, e.g. zinc sulphide, cadmium sulphide, zinc selenite, cadmium selenite;

sulphates, in particular barium sulphate and strontium sulphate;

phosphates, in particular barium phosphate, strontium phosphate, calcium phosphate, yttrium phosphate, lanthanum phosphate, as well as more complex phosphate-based compounds such as apatites, including, inter alia, calcium hydroxyl apatites, calcium fluorapatites, calcium chlorapatites; or spodiosites, including e.g. calcium fluorospodiosites, calcium chlorospodiosites;

silicates and alumino silicates, in particular zeolites such as zeolite A, zeolite Y; zeolite-related compounds, such as sodalites; feldspars, such as alkali feldspars, plagioclases;

further inorganic compound classes such as vanadates, germanates, arsenates, niobates, tantalates.

Figure 3B:
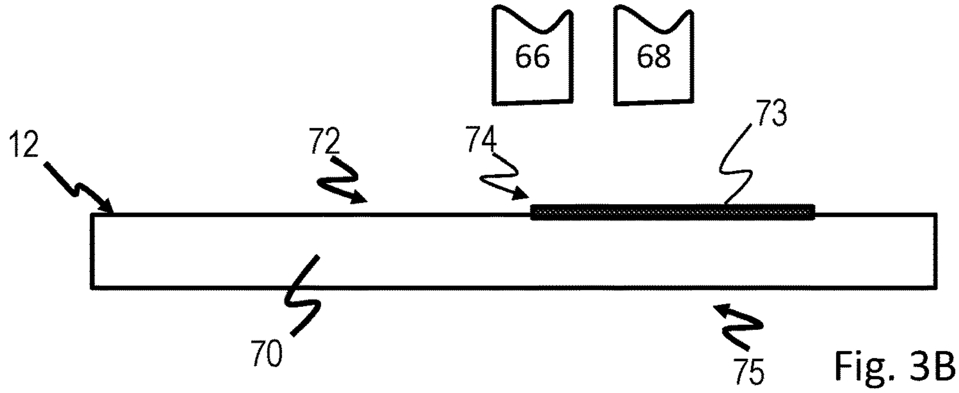
Figure 3C:
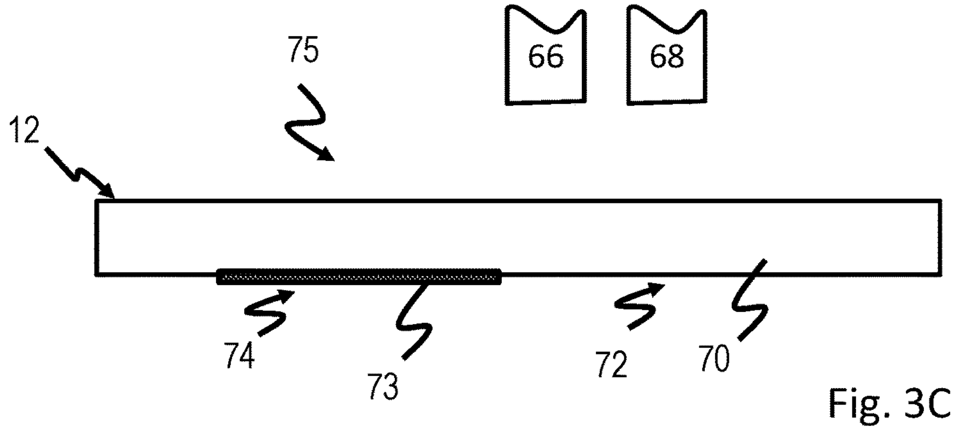

As shown schematically in a side view in FIGS. 3A to 3D, such a value document of the given value document type can be present in four different orientations: with the front side 72 on a first side of the capture region 60 and thus facing the excitation device 66 and the security feature 74 on the left (FIG. 3A) or on the right (FIG. 3B), or with the front side 72 on a second side opposing the first side of the capture region, or with the back side 75 on the first side of the capture region 60 and thus facing the excitation device 66 and the security feature 74 on the right (FIG. 3D) or left (FIG. 3C). In other embodiment examples, the security feature 74 may also be symmetrically applied. In this case, only two orientations are to be distinguished, which correspond to FIGS. 3A and 3B and FIGS. 3C and 3D, respectively.

In this embodiment example, it is assumed that the value document 12 is transported in one of the last two orientations or the latter of the two orientations in the transport path 36, in which the back side 75 of the value document faces the excitation device 66. For this, the stack of value documents 12 fed to the singler 22 may have value documents 12 in one of the last two orientations or the latter of the two orientations. During singling, the orientations remain unchanged so that the value documents 12 are transported in the respective orientation along the transport path 36. The value documents in the stack can have the same orientation or mutually different orientations.

Figure 4:
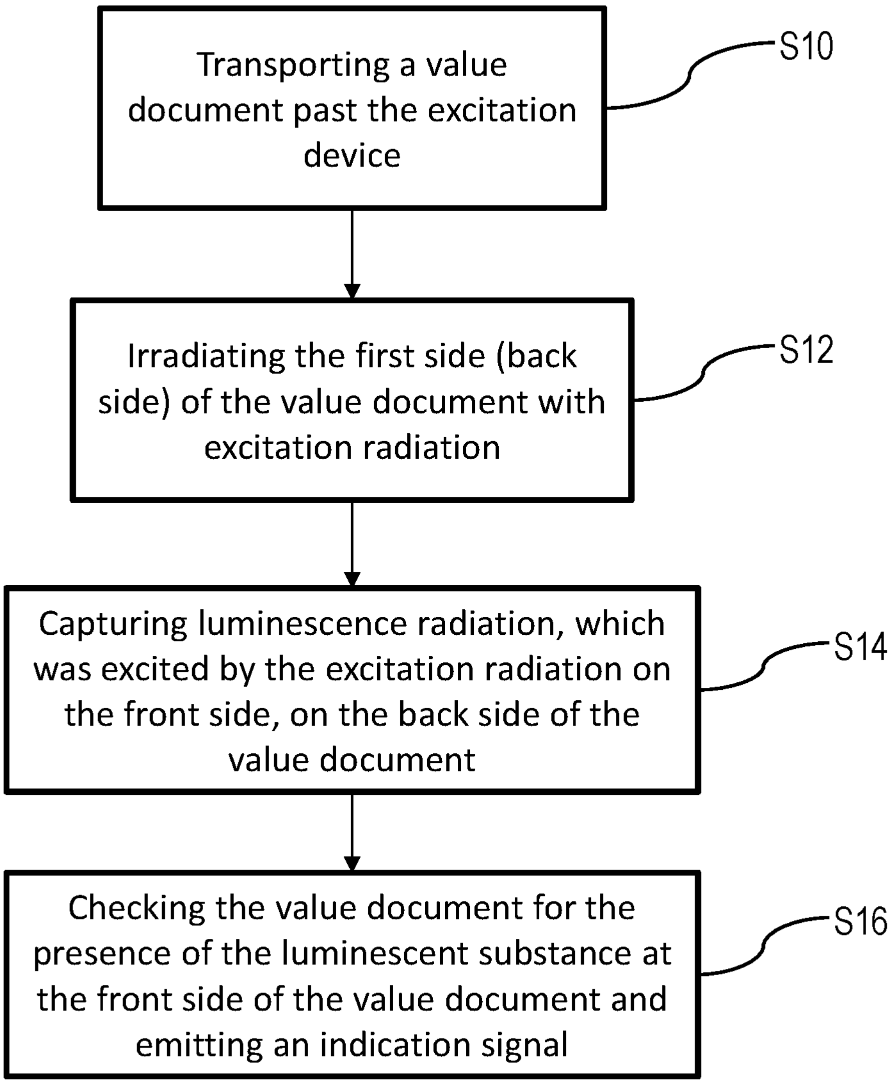

By means of the transport device 18 and the checking apparatus 44, the following method for checking a value document, illustrated in FIG. 4, is now carried out for each of the value documents, wherein the steps are executed partly in parallel:

In step S10, the transport device 18 transports the value document 12 through the capture region 60 and past the excitation device 66. The first side of the value document 12 facing the excitation device 66 is here the back side 75 of the value document 12, that is, the value document is in an orientation in which the back side 75 of the value document faces the first side of the capture region 60 or of the excitation device 66 (cf. FIGS. 3C and 3D).

Meanwhile, in step S12, the excitation device 66 irradiates the first side of the value document in the transport path 36 in the capture region 60, i.e. the value document 12 from its back side 75.

When the value document 12 is irradiated from the first side, in the example the back side 75, with excitation radiation 67 of the excitation device 66, part of the excitation radiation 67 enters the value document 12, in particular its substrate 70. Since the substrate 70 is at least partially transparent to the excitation radiation 67, a part of the excitation radiation reaches the front side 72 of the substrate 70 or value document 12 where it excites the luminescent substance 73. The luminescent substance then emits luminescence radiation with the properties characteristic thereof, a part of which passes through the substrate 70, which is at least partially transmissive to the luminescence radiation, to the back side 75 of the value document 12 and exits therefrom.

In step S14, the capture device 68 captures the luminescence radiation 69 emanating from the value document, more precisely from its back side, forming detection signals which are fed to the evaluation device 64.

In step S16, the evaluation device 64 checks the value document in dependence on at least one property of the captured luminescence radiation 69. From the detection signals of the capture device 68, it ascertains the intensity of the luminescence radiation as a property of the luminescence radiation and compares this with a specified reference value. In this embodiment example, as intensity there is used a mean value over the intensities or detection signals which are captured for a respective value document. If the intensity is above the reference value, the captured luminescence radiation represents an indication of the presence of the luminescent substance at the front side of the value document. The evaluation device 64 then emits an indication signal, which represents the found indication of the presence of the luminescent substance at the front side 72 of the value document and thus also of the authenticity of the value document, to the machine control and evaluation device 46. Otherwise, it emits an indication signal which represents an absence of the luminescent substance at the front side 72 and thus an indication of a forgery.

The machine control and evaluation device 46 ascertains a sorting class in dependence on the indication signal and the sensor data of the other sensors.

The reference value used in step S16 can be ascertained, for example, by examining one or several reference value documents of the specified value document type by carrying out the steps S10, S12 and S14 for each of the reference value documents. During transport, the reference value documents are in an orientation in which the back side faces the first side of the capture region or of the excitation device.

A second embodiment example differs from the first embodiment example in that the value documents of the given value document type are checked in an arbitrary orientation, i.e. the front side having the luminescent substance or the back side can face the first side. The corresponding checking apparatus 44, more precisely its evaluation device 64, and the machine control and evaluation device 46 do not differ in their configuration from those of the first embodiment example, except that the value documents may be present in the input pocket 20 in at least two orientations, in which for some value documents the front side faces upwards and for others the front side faces downwards.

In step S10, the transport device transports the value document through the capture region and past the excitation device. The value document here is in an orientation in which either the front side of the value document or the back side of the value document faces the first side of the capture region or of the excitation device. As far as the value document processing apparatus is concerned, step S10 does not differ from the step S10 of the first embodiment example.

However, upon irradiation of the value document with excitation radiation 67 in step S12, the following happens:

If the first side, i.e. the side of the value document directly irradiated by the excitation device 66, is the back side 75 of the value document 12 (cf. FIGS. 3C and 3D), at least a part of the excitation radiation 67 enters the value document 12, crosses through the substrate 70 and then excites the luminescent substance 73 on the front side 72 of the substrate 70 or on the front side of the value document 12 to luminescence. The luminescent substance 73 emits luminescence radiation, a part of which passes through the substrate 70 to the back side 75 of the value document, i.e. its first side, and exits the value document 12.

However, if the first side of the value document, i.e. the side facing the excitation device 66, is the front side of the value document (cf. FIGS. 3A and 3B), the excitation radiation 67 directly impinges the luminescent substance 73 on the front side 72 of the substrate 70 and excites it to luminescence. A part of the luminescence radiation 69 excited in this way is emitted directly into the capture region 60.

Step S14 is unchanged: the luminescence radiation thus emanating from the value document is captured by means of the capture device 68.

In step S16, the evaluation device 64 checks the value document in dependence on at least one property of the captured luminescence radiation. From the detection signals of the capture device 68, it ascertains, as in the first embodiment example, the intensity of the luminescence radiation as a property of the luminescence radiation and compares this with a specified reference value. If the intensity is above the reference value, the captured luminescence radiation represents an indication of the presence of the luminescent substance at the front side of the value document, regardless of the orientation that the value document has taken. The evaluation device 64 then emits a signal, which represents the found indication of the presence of the luminescent substance at the front side of the value document and thus also of the authenticity of the value document, to the machine control and evaluation device 46. Here, as a reference value there is used the reference value used in step S16 of the first embodiment example, because in the case where the luminescence is excited from the back side of the value document, the excitation radiation is weakened somewhat when passing through the substrate and the luminescence radiation generated by the weakened excitation radiation is weakened somewhat when crossing through the substrate to the back side, and the resulting luminescence radiation emanating from the value document is weaker than the luminescence radiation emanating from the value document when the front side is directly irradiated.

Otherwise, it emits an indication signal which represents an absence of the luminescent substance at the front side 72 and thus an indication of a forgery of the value document.

Figure 5:
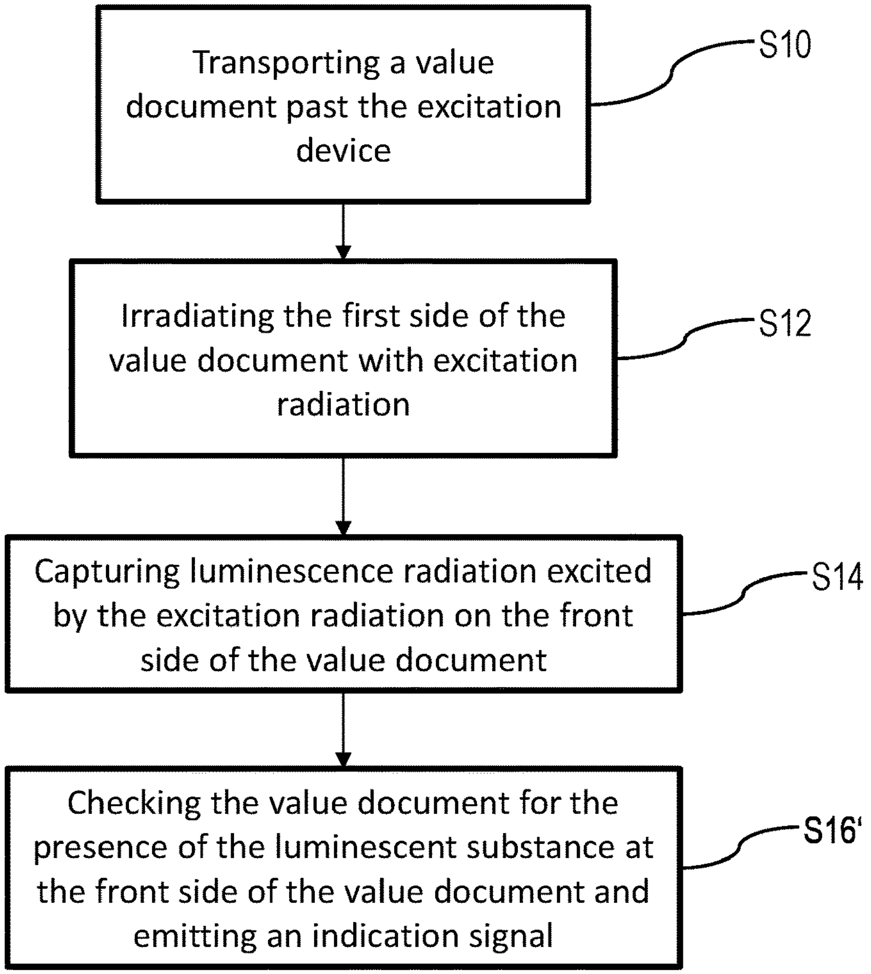

A third embodiment example (cf. FIG. 5) differs from the second embodiment example in that the step S16' is changed compared to step S16, but the steps S10, S12 and S14 are unchanged. Upon checking, the orientation of the value document 12 is taken into account during the capturing of the luminescence radiation. More precisely, it is checked whether the captured luminescence radiation represents the presence of the luminescent substance at the front side 72 of the value document 12. The corresponding checking apparatus 44, more precisely its evaluation device 64, and the machine control and evaluation device 46 differ in their configuration from those of the second embodiment example only by their programming or configuration for carrying out the step S16' and the further use of the results of step S16'.

For step S16', a first check criterion is now specified for orientations in which the first side facing the excitation device 66 is the front side 75 and the luminescent substance 73 is directly illuminated by the excitation device 66 with excitation radiation 67, and a second check criterion is specified for orientations in which the back side 75 is irradiated with excitation radiation 67 and the luminescent substance on the front side 72 is indirectly irradiated by the excitation radiation transmitted by the substrate 70.

In this embodiment example, the two check criteria have the same structure but use different parameter values. Here, simple threshold value criteria are used, which, however, must be checked in the correct, specified order. It is checked whether the intensity of the captured luminescence radiation is above a first or second reference value.

Since the captured luminescence radiation is stronger in the case of the direct irradiation of the luminescent substance 73 at the front side of the value document than in the case of the indirect illumination through the substrate 70, the first reference value is chosen to be greater than the second reference value. The first reference value can be obtained, for example, with the apparatus used for checking, by capturing luminescence radiation intensities in the different orientations for one or several specified reference value documents of the value document type, the capture conditions substantially corresponding to those for checking. The first reference value can be chosen, for example, between the mean value of the luminescence radiation intensities at direct irradiation with excitation radiation and the mean value of the luminescence radiation intensities at indirect irradiation.

The second reference value may be slightly smaller than the mean value of the luminescence radiation intensities at indirect irradiation.

Figure 6:
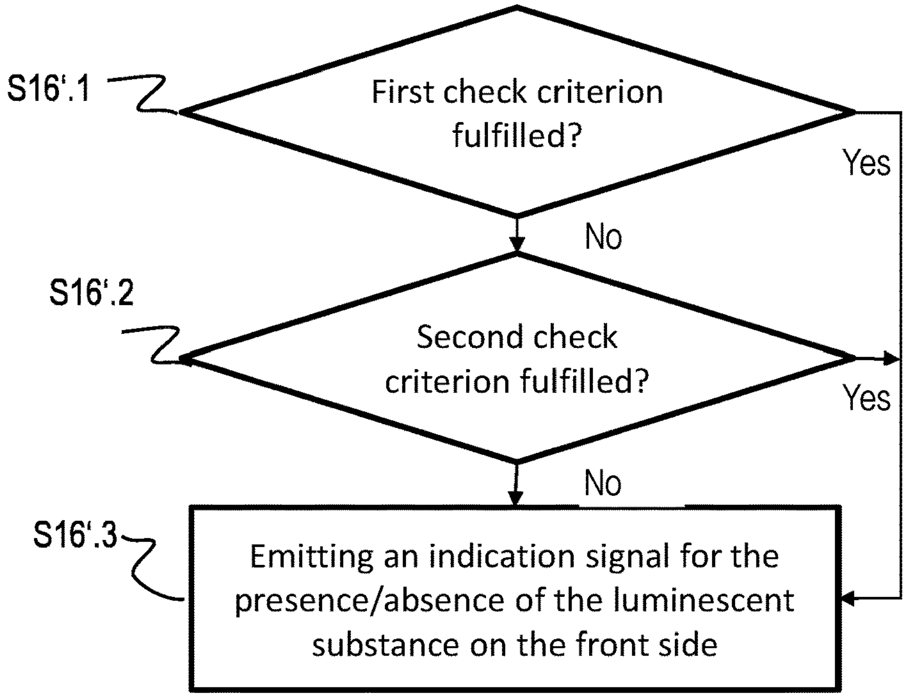
FIG. 6 a schematic flow chart of a step S16' in the method of FIG. 5.

The substeps of the step S16' are roughly schematically shown in FIG. 6. When checking, in step S16' it is first checked in a first substep S16'.1 as a first check criterion whether the intensity of the captured luminescence radiation is above the first reference value. If this is the case, an indication of the presence of the luminescent substance on the front side of the value document is recognized, the front side being the first side of the value document. If this is not the case, the second check criterion is checked in substep S16'.2. More precisely, it is checked whether the intensity of the captured luminescence radiation is above the second reference value. If this is the case, an indication of the presence of the luminescent substance on the front side of the value document is recognized, but the front side being the second side of the value document not directly irradiated with excitation radiation.

Otherwise, it is recognized that there is no or not enough luminescent substance present on the front side of the value document.

Two signals are then emitted in substep S16'.3, the first one representing whether or not the luminescent substance is present on the front side of the value document, and the second representing whether in the case of a presence the front side is the first or the second side.

Alternatively, only one signal needs to be emitted which represents the three results found, for example by the amplitude of the signal.

The machine control and evaluation device 46 of the value document processing apparatus 10 is configured to receive these signals and to compare the information about the orientation with information about the orientation of the value document which can be obtained by means of another sensor, in the example of the remission sensor 40, which captures an image of the value document 12. Thus, there results an increased security of the check.

A fourth embodiment example differs from the second embodiment example in that the step S16" is changed compared to step S16', but the steps S10 to S14 are unchanged. In particular, value documents can be present in any arbitrary orientation in the input pocket and then checked during transport. Upon checking, the orientation of the value document is taken into account during the capturing of the luminescence radiation.

For step S16", a first check criterion is now specified for orientations in which the front side is directly illuminated with excitation radiation by the excitation device and a second check criterion is specified for orientations in which the back side is irradiated with excitation radiation and the luminescent substance on the front side is indirectly irradiated by the excitation radiation that has penetrated through the substrate.

In this embodiment example, the two check criteria again have the same structure but use different parameter values. For both criteria, it is checked whether the intensity of the captured luminescence radiation lies within first or second reference intervals.

The limits of the reference intervals can be obtained analogously to the third embodiment example by examining one or more reference value documents in different orientations. For example, a respective interval can be set as the one interval in which a specified portion of the captured luminescence radiation intensities or all luminescence radiation intensities is or are located. The reference intervals are chosen such that they do not overlap.

When checking in step S16", the order of checking the check criteria is not important. In each case, it is checked whether the intensity of the captured luminescence radiation lies within the respective reference interval. If this is the case, an indication of the presence of the luminescent substance on the front side of the value document is recognized, the orientation of the front side resulting from the check criterion that has been fulfilled.

If the intensity of the captured luminescence radiation is not within one of the two reference intervals, it is recognized that there is no or an incorrect amount of luminescent substance on the front side of the value document.

Checking whether the intensity of the captured luminescence radiation is within specified intervals is significantly more stringent than a check with threshold value criteria and thus more accurate.

Two signals are then emitted, the first one representing whether or not the luminescent substance is present on the front side of the value document, and the second representing whether in the case of a presence the front side is the first or the second side.

Alternatively, only one signal needs to be emitted which represents the three results found, for example by the amplitude of the signal.

The machine control and evaluation device 46 of the value document processing apparatus 10 is configured to receive these signals and to compare the information about the orientation with information about the orientation of the value document which can be obtained by means of another sensor, in the example of the remission sensor 40, which captures an image of the value document. Thus, there results an increased security of the check.

Figure 7:
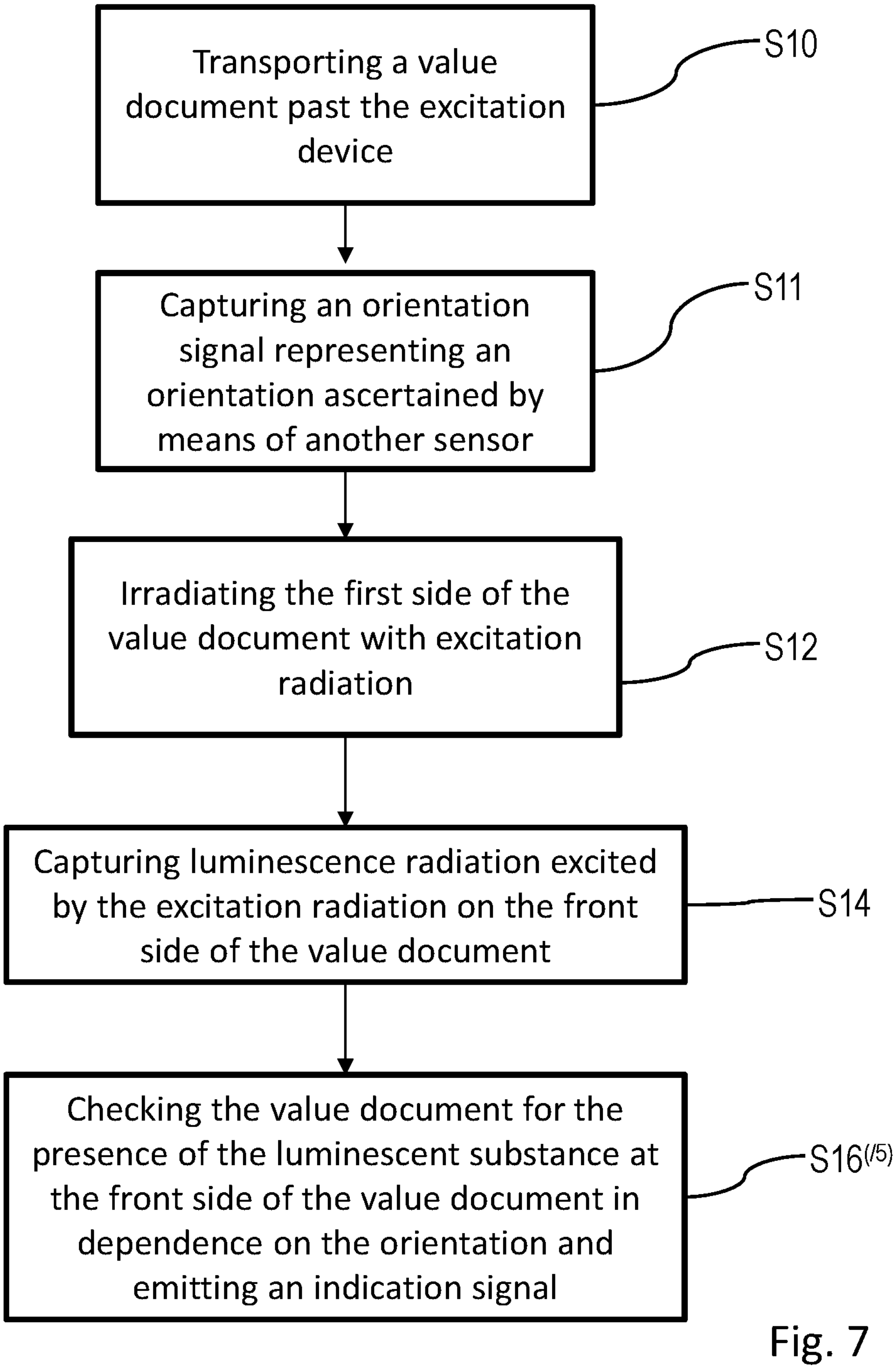
FIG. 7 a schematic flow chart of a fifth example of a method for checking a value document with a luminescent substance applied to only one side, FIG. 8 a schematic diagram of another example of a checking apparatus of the value document processing apparatus in FIG. 1, in a side view transverse to a transport direction and in a sheet plane of a value document, FIGS. 9A and 9B schematic diagrams of courses of different portions of the excitation radiation and luminescence radiation when using the checking apparatus of FIG. 5 in a value document with a luminescent substance applied to one side, in two different orientations relative to an excitation device and a capture device of the checking apparatus of FIG. 5, FIG. 10 an example of a reflection device of a checking device of FIG. 8 in a side view.

A fifth embodiment example in FIG. 7 differs from the third and fourth embodiment examples in that prior to checking the value document an orientation of the value document 12 transported past the sensor device 62 is ascertained on the basis of the captured properties of the luminescence radiation by means of another sensor, in the example of the remission sensor 40. The checking of the luminescence property in the evaluation device 64 is then also effected in dependence on the ascertained orientation information. The checking apparatus 44 differs from the checking apparatus of the third or fourth embodiment example only in that the evaluation device 64 is replaced by a modified evaluation device 64". The latter is configured to receive the orientation signal of the machine control and evaluation device 46 and to execute the steps to be carried out by the evaluation device in the following embodiment example. All other components are unchanged, and the explanation about these also apply here accordingly.

In the example, for ascertaining the orientation, an image is used that is captured by means of the remission sensor 40, while the value document is transported past, and in the example evaluated by the machine control and evaluation device 46. The machine control and evaluation device 46 generates an orientation signal representing the orientation of the value document in the transport path and transmits this to the checking device 44, or more precisely its evaluation device 64.

In the method, step S10 is unchanged compared to step 10 of the third and fourth embodiment examples.

At least partially parallel to this step, in step S11 an image of the value document is captured by means of a sensor, in the example of the remission sensor 40. An orientation of the value document is ascertained from the image and an orientation signal rendering the orientation is formed, which in the example is carried out by the machine control and evaluation device 46. The orientation signal is transmitted to the checking device 44, more precisely the evaluation device 64 or its interface to the machine control and evaluation device 46, which captures the orientation signal.

The steps S12 and S14 are unchanged compared to steps S12 and S14 of the third and fourth embodiment examples.

Step S16$^{(5)}$ differs from step S16' of the third embodiment example or from step S16" of the fourth embodiment example in that, depending on the received orientation signal, only that of the two check criteria is checked which is provided for the orientation which is represented by the orientation signal.

This embodiment example has the advantage that, on the one hand, the evaluation of the properties of the captured luminescence radiation is less complex and, on the other hand, the captured orientation information can also be used for other purposes in the value document processing apparatus 10. In addition, a more accurate check is achieved, because it is excluded that an incorrectly dosed luminescent substance only accidentally fulfills the check criterion which corresponds to the non-existent orientation of the value document.

In other embodiment examples, as an alternative to or in combination with the intensity of luminescence radiation excited by the excitation radiation in the wavelength region specified by the capture device, a spectrum of the captured luminescence radiation, which comprises intensities of the luminescence radiation in at least two narrow wavelength regions, may also be used.

In still other embodiment examples, as an alternative or in addition to the checks in the previously described embodiments, the spatial distribution of the luminescent substance on the value document resulting from the spatial distribution of luminescence radiation may be used as the sole or further property of the luminescence radiation.

The checking apparatus is then configured to capture in a spatially resolved manner the luminescence radiation excited by the excitation device 66 and to generate corresponding luminescence images of the value document 12 or at least of the security feature 74, which are evaluated in the evaluation device for checking the value document 12. A luminescence image here is understood to be the representation of a spatial dependence of the property of the excited luminescence radiation.

In still other embodiment examples, upon checking there can be additionally used a dynamic property as a luminescence property, for example the rise and/or decay behavior of the luminescence.

Still other embodiment examples may differ from the described embodiment examples in that the excitation device 66 is arranged to emit excitation radiation 67 in the visible (VIS) spectral range, and the capture device 68 is arranged to capture radiation, in particular luminescence radiation 69, in the visible (VIS) spectral range. There can then be used value documents with luminescent substances that are excitable to luminescence in the VIS.

Other embodiment examples differ from those described above in that value documents can be checked which instead of the polymer substrate have a hybrid substrate with at least one polymer layer and one bank note paper layer or even a paper substrate.

Still other embodiment examples may differ from the previously described embodiment examples in that the sensor part 62 has a spectral sensor in which the excitation device 66 emits excitation radiation pulses in specified, in particular different, wavelength regions in a specified temporal sequence and the capture device 68 captures any excited luminescence radiation in spectrally resolved manner for each of the pulses. Such a spectral sensor is described in the applicant's DE 10 2009 058 805 A1 whose content is hereby incorporated in the description by reference. Upon checking, the captured spectrum of the captured luminescence radiation, i.e. the intensity of the luminescence radiation at specified wavelengths or in specified wavelength regions, can then be used as the property of the luminescence radiation.

Still other embodiment examples may differ from the previously described embodiment examples in that the capture device 68 comprises a spectrometer. The applicant's DE 10 2006 045 624 A1 describes an apparatus in which the excitation device 66 and the capture device 68 are partially integrated. The contents of DE 10 2006 045 624 A1 are hereby incorporated in the description by reference. Upon checking, the captured spectrum of the captured luminescence radiation, i.e. the intensity of the luminescence radiation at specified wavelengths or in specified wavelength regions, can be used as the property of the luminescence radiation here as well.

Figure 8:
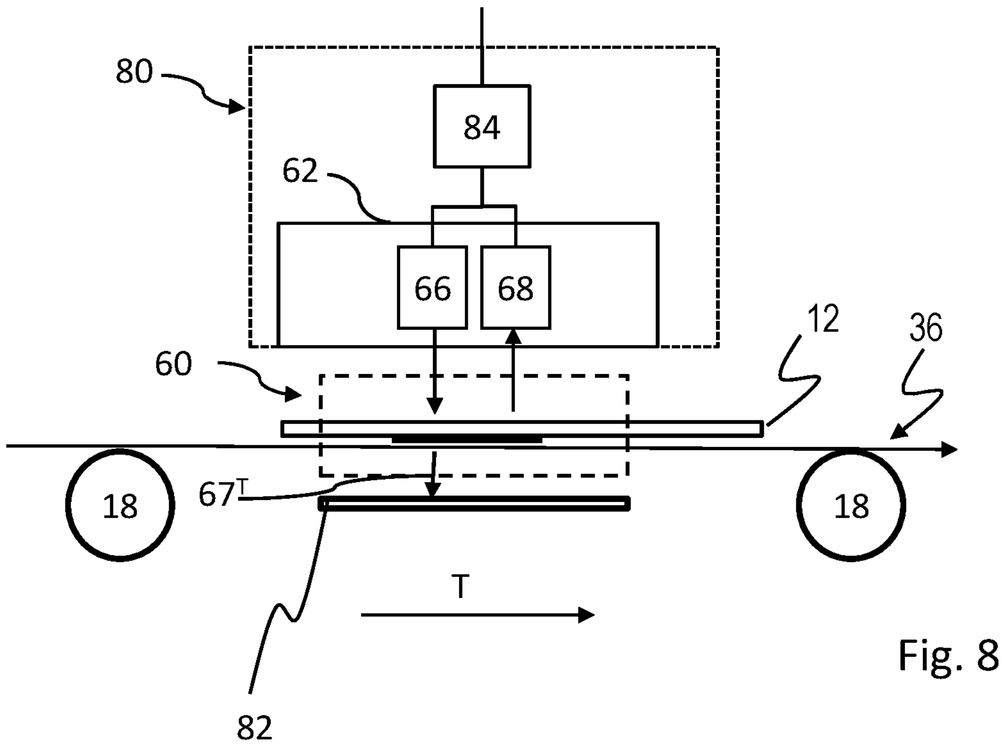

FIG. 8 shows another example of a checking apparatus 80 for checking value documents which have a front side 72 and a back side 75 opposing the front side and which comprise a substrate 70 and a specified luminescent substance 73 preferably applied to the substrate 70 in at least one section of the front side of the value document 12, that is, value documents as they are checked in the preceding embodiment examples. In the value document processing apparatus 10, the checking apparatus 44 is replaced by the checking apparatus 80, which differs from the checking apparatus 44 only in that a reflection device 82 is now provided. All other components of the apparatus with the exception of the evaluation device 64, which is replaced by an evaluation device 84, are unchanged, so that the same reference signs are used for these and the explanations for these in the previous embodiment examples also apply here.

The reflection device 82 is configured and disposed to reflect optical radiation coming from the capture region 60 back into the capture region 60 so that, when a value document 12 is present in the capture region 60, the radiation at least partially impinges on the value document 12 and at least partially enters the latter.

In the example, the reflection device 82 reflects both excitation radiation 67$^{T}$ coming from the capture region 60 and luminescence radiation of the luminescent substance 73 generated by the excitation radiation, which is emitted into the capture region 60 but not into the substrate 70.

Figure 3D:
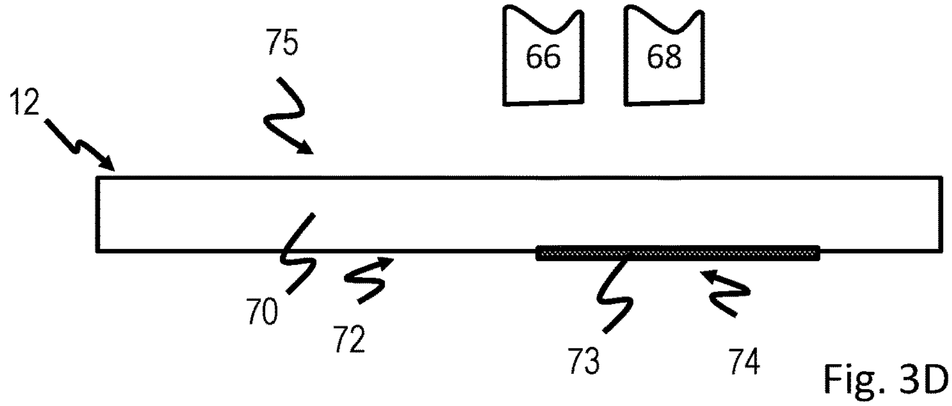
Figure 9A:
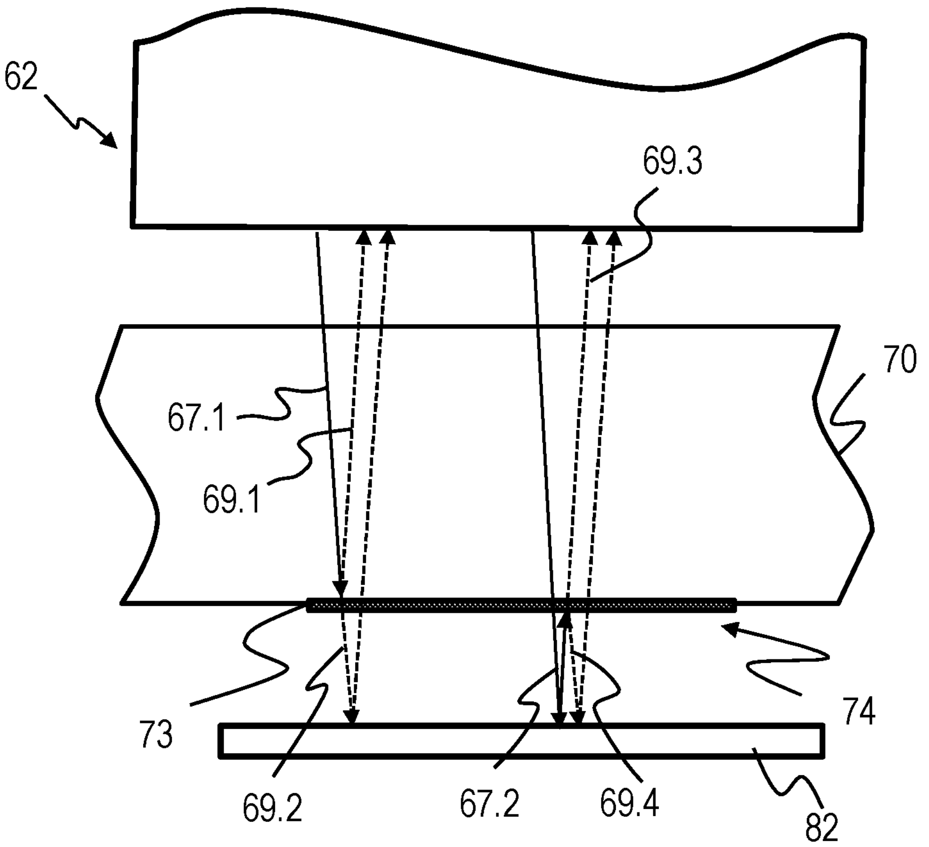
Figure 9B:
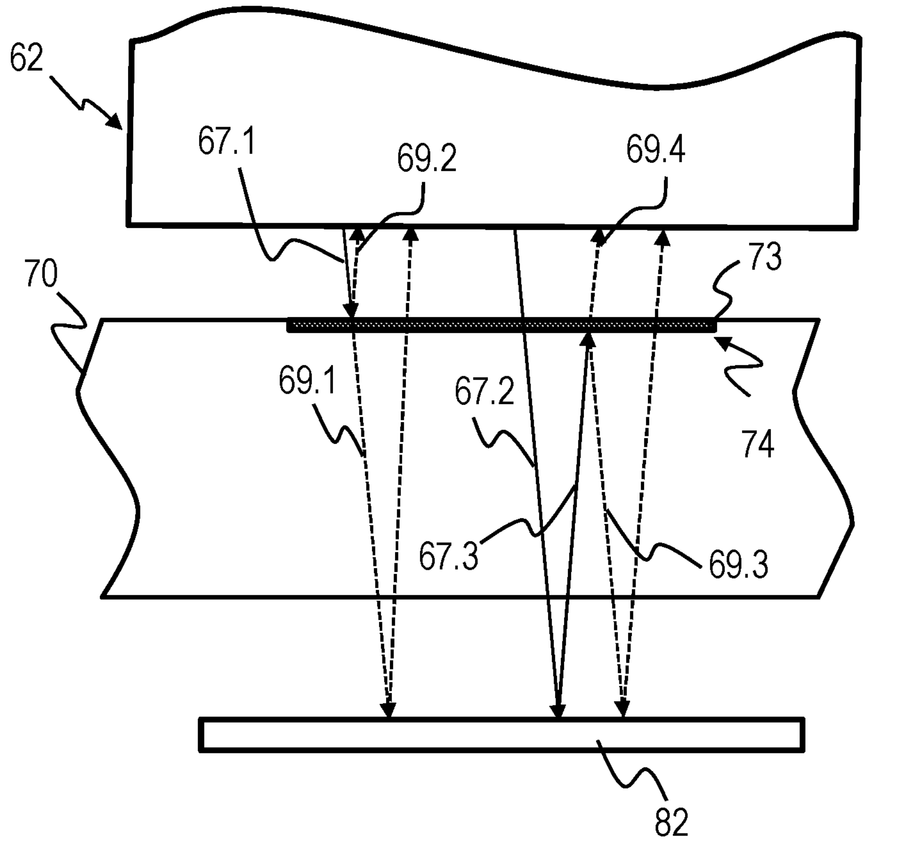

The excitation of luminescence is then effected with less loss, in particular when the value document assumes an orientation illustrated in FIG. 9A and corresponding to the orientation in FIG. 3C or 3D. In FIGS. 9A and 9B, different excitation and reflection processes are shown side by side for clarity, the oblique incidence only serves to provide a clearer representation.

If the excitation radiation 67 reaches the luminescent substance 73 through the substrate 70, the luminescent substance is excited to luminescence by a portion 67.1. The arising luminescence radiation is emitted partly into the substrate (69.1) and partly into the capture region 60 (69.2). The part 69.1 of the luminescence radiation emitted into the substrate penetrates at least partly the substrate 70 and is emitted on the first side or on the back side 75. The part 69.2 of the luminescence radiation emitted into the capture region 60 would be lost without the reflection device 82, but in the example it is reflected back onto the value document 12, passes through it at least partly to the first side, the back side, and can then be captured by the capture device while emanating from the value document.

Further, a part 67.2 of the excitation radiation that has passed through the substrate but has not excited luminescence radiation exits the value document and through the capture region 60 reaches the reflection device 82. The latter reflects this part 67.2 of the excitation radiation at least partly back onto the value document, where it impinges the luminescent substance 73 on the front side 72. The luminescent substance 73 is again excited to luminescence. The luminescence radiation 69.3 excited by the reflected excitation radiation 67.2 is partially emitted into the substrate and, after transmission through the substrate 70, can be captured by means of the capture device 66 while emanating from the value document. Another part 69.4 of the luminescence radiation excited by the reflected excitation radiation 67.3 is emitted into the capture region 60, reaches the reflection device 82 and is reflected by the latter back onto the value document. The reflected luminescence radiation 69.4 penetrates the value document at least partly. It then emanates from the value document on the back side and can be captured by means of the capture device 66.

Thus, the capture device 66 captures in the first order a total of four contributions of luminescence radiation: the non-reflected part 69.1 generated directly by the excitation radiation 67.1, the reflected part 69.2 generated directly by the excitation radiation 67.1, the non-reflected part 69.3 generated by the reflected excitation radiation 67.2, and the reflected part 69.4 generated by the reflected excitation radiation 67.2. These parts cannot be separated, but are captured together as luminescence radiation 69 generated by the excitation radiation; by contrast, in a checking device without reflector according to FIG. 2, only the luminescence corresponding to the portion 69.1 can be detected.

The excitation of luminescence is also effected with less loss, when the value document assumes an orientation illustrated in FIG. 9B corresponding to the orientation in FIG. 3A or FIG. 3B.

If the excitation radiation 67 directly reaches the front side 75 and thus the luminescent substance 73, the latter is excited to luminescence by a portion 67.1. The arising luminescence radiation is emitted partly into the substrate (69.1) and partly into the capture region 60 (69.2). The part 69.1 of the luminescence radiation emitted into the substrate penetrates at least partly the substrate 70, is reflected by the reflection device 82, passes through the value document 12 again and is emitted at the first side or front side 72. The part 69.2 of the luminescence radiation emitted into the capture region 60 on the first side can be captured directly by the capture device 68 as part of the luminescence radiation emanating from the value document.

Further, a part 67.2 of the excitation radiation that has not excited luminescence on the front side of the value document passes through the substrate 70 and is reflected back onto the value document by the reflection device 82. This portion 67.3 crosses through the substrate 70 and impinges on the luminescent substance 73 at the front side 75. The luminescent substance 73 is again excited to luminescence. The luminescence radiation 69.3 excited by the reflected excitation radiation 67.3 is partially emitted into the substrate and, after transmission through the substrate 70, reflection at the reflection device 82 and renewed transmission through the value document, can be captured as emanating from the value document by means of the capture device 68. Another part 69.4 of the luminescence radiation excited by the reflected excitation radiation 67.3 is emitted directly into the capture region 60 and can be captured by means of the capture device 68.

Thus, the capture device 68 captures in the first order a total of four contributions of luminescence radiation: the non-reflected part 69.2 generated directly by the excitation radiation 67.1, the reflected part 69.1 generated directly by the excitation radiation 67.1, the reflected part 69.3 generated by the transmitted, reflected excitation radiation 67.3, and the non-reflected part 69.4 generated by the reflected excitation radiation 67.3. These parts cannot be separated, but are captured as luminescence radiation 69 generated by the excitation radiation. By contrast, in a checking device without reflector according to FIG. 2, only the luminescence corresponding to the portion 69.2 can be detected.

In this way, at a given intensity of excitation radiation, luminescence radiation is captured that is significantly stronger than without the reflection device 82.

The previously described embodiment examples for the checking method can be carried out accordingly with the checking apparatus 80, during and/or after the step S12 and before or during the step S14, however, a step S13 of reflecting excitation and luminescence radiation emanating from the value document on the second side back onto the value document being executed.

The distance between the transport path and the reflection device 82 is between 8 and 12 mm in the example, more precisely about 10 mm. In other embodiment examples, however, greater or smaller distances may be provided.

Preferably, the reflection device 82 has a high reflectivity or a high reflecting power, in the example of more than 95%, for both excitation radiation and luminescence radiation, in order to be able to exploit both mechanisms of action mentioned above.

The reflection device 82 may either reflect directionally or specularly (i.e. actually mirror) or backscatter radiation diffusely or isotropically (i.e. white scattering surface). Suitable embodiments for the reflection device 82 comprise, for example, a metallic reflector, a dielectric layer stack, a white polymer foil, a white ceramic, and a white ink layer. However, other reflective or diffusing materials are also conceivable.

Depending on the design of the reflection device 82, for example as a white foil or aluminum reflector, increases of different extents in the capturable or captured luminescence intensity or luminescence radiation intensity can be achieved depending on the requirements or application.

The embodiments of the reflection device 82 in FIGS. 10 to 17 represented in the following are characterized by the fact that the reflection device is configured in each case in such a way that it focuses the reflected excitation and/or luminescence radiation into the capture region. A focal plane or a focal point of the reflection device is less than 2 mm, preferably less than 1.5 mm, above and less than 2 mm, preferably less than 1.5 mm, below a transport plane along which the value documents are transported on the transport path 16. The excitation and/or luminescence radiation is then at least approximately focused onto the transported value documents during reflection. Due to the focusing, the reflected excitation radiation can excite more luminescence radiation at least approximately in the capture region and thus in the value document therein, which can be captured by the capture device. The luminescence radiation focused at least approximately in the capture region and thus in the value document can also be captured better, since the capture device is configured in such a way that it can capture luminescence radiation coming from the capture region. Without such a focusing, reflected portions might not be captured by the capture device, depending on the direction of propagation.

Figure 10:
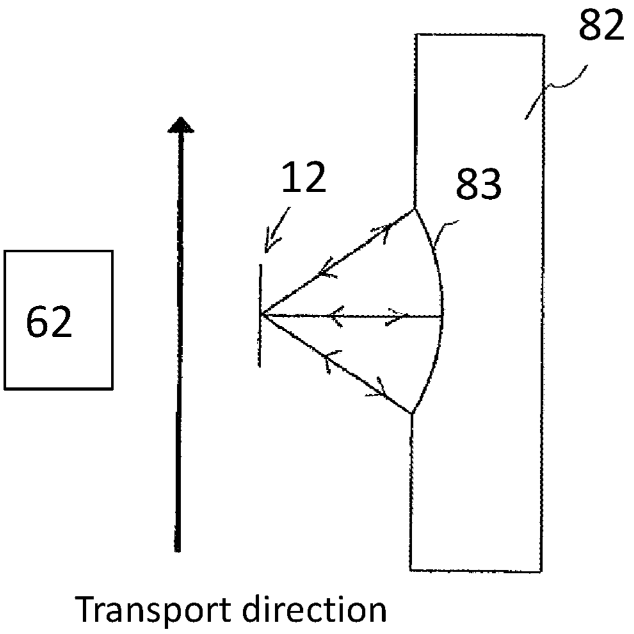

FIG. 10 shows a further embodiment of the reflection device 82 in a schematic side view. The reflection device 82 has a cylindrical concave mirror 83, which is shown in cross-section here and is preferably positioned such that the radius of curvature of the cylinder area lies approximately in the center of the capture region 60 or the measuring plane of the sensor part 62 and/or in the plane of the substrate 70 or value document 12 in the transport path. The scattered excitation radiation and/or the luminescence radiation which arises near the focal line is reflected back approximately into the focal line by the cylindrical concave mirror 83, as illustrated by the rays marked with arrows. Optionally, a transparent protective pane made of glass, sapphire or the like can be attached between the transport plane of the value documents and the reflection device.

Figure 11:
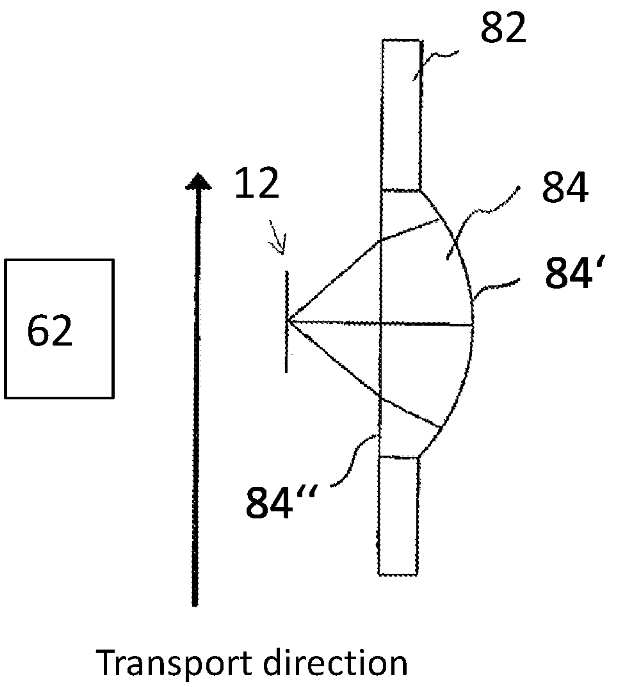
FIG. 11 an example of a reflection device of a checking device of FIG. 8 in a side view.

FIG. 11 shows a further embodiment of the reflection device 82 in a schematic side view. Instead of the cylindrical concave mirror 83, the reflection device 82 has a reflectively coated cylindrical lens 84, which is represented here in cross-section and whose convexly curved side 84' is coated reflectively. Analogous to the example shown in FIG. 10, here, too, the scattered excitation radiation and/or the luminescence radiation which arises near the focal line is reflected back approximately into the focal line. The advantage of this embodiment is that toward the bank note transport plane a planar area 84" is present, which is robust against bank note abrasion, reduces the risk of a transport jam and can be easily cleaned.

Figure 12:
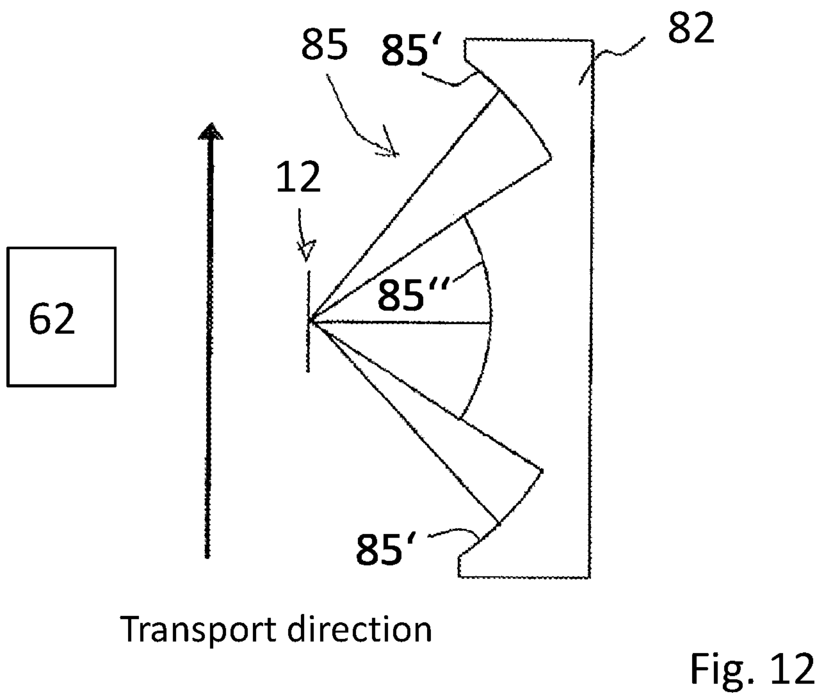
FIG. 12 an example of a reflection device of a checking device of FIG. 8 in a side view.

FIG. 12 shows another embodiment of the reflection device 82 in a schematic side view. In contrast to the example shown in FIG. 10, the reflection device 82 has, instead of a cylindrical concave mirror 83, a Fresnel cylindrical concave mirror 85 which has several cylinder areas 85', 85" with different radii, which are positioned such that a common focal line results, which lies approximately in the center of the capture region 60 or in the measuring plane of the sensor part 62 or in the transport plane of the value document 12. The scattered excitation radiation and/or the luminescence radiation which arises near the focal line is reflected back into the focal line by the mirror areas 85', 85" in a significantly greater angle region than in the case of a simple cylindrical concave mirror. Optionally, a transparent protective pane made of glass, sapphire or the like can be attached between the transport plane of the value documents and the reflection device.

Figure 13:
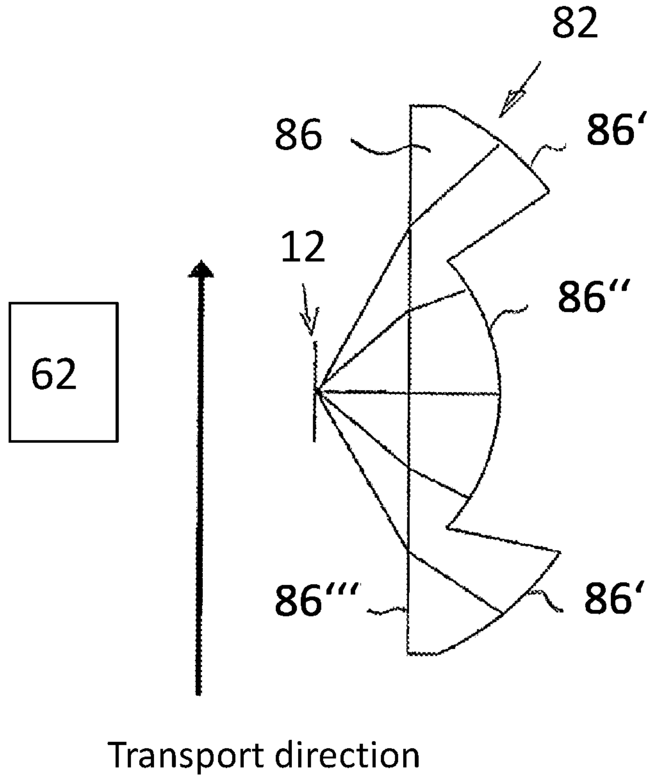
FIG. 13 an example of a reflection device of a checking device of FIG. 8 in a side view.

FIG. 13 shows another embodiment of the reflection device 82 in a schematic side view. The reflection device 82 here has a Fresnel cylindrical lens 86 whose curved areas 86', 86" are reflectively coated. Analogous to the example shown in FIG. 12, in this embodiment several convex cylindrical lens areas 86', 86" with different radii are combined or disposed such that a Fresnel cylindrical lens with one single focal line arises, and the curved sides are reflectively coated. The advantage of this embodiment is in particular that there arises a planar area 86" toward the bank note transport plane, which is robust against bank note abrasion and can be easily cleaned. Due to the Fresnel arrangement, greater angle regions can be reflected back than with a simple cylindrical lens.

Figure 14:
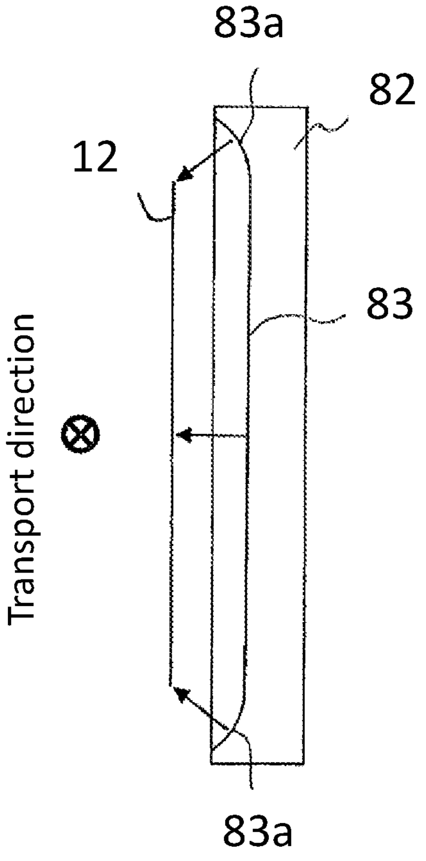
FIG. 14 an example of a reflection device of a checking device of FIG. 8 in a side view.

FIG. 14 shows a particular design of edge regions of the reflection device 82 in FIG. 10 in a cross-sectional representation perpendicular to the transport direction. In the example shown, the upper and the lower end of the reflecting area (circumferential area) of the cylindrical concave mirror 83 (cf. FIG. 10) each have a spherically or aspherically curved section 83*a* by means of which the edge falloff of the cylinder reflection is reduced and/or compensated for by reflecting at least a part of the excitation and/or luminescence radiation emanating from the value document 12 in the direction of the ends of the cylindrical concave mirror 83 again toward the value document 12, as indicated by the two outer arrows. This ensures that an increase in the capturable luminescence intensity or luminescence radiation intensity is also achieved at the outermost or uppermost and lowermost tracks of the sensor part (not shown). A corresponding design of the edge regions is also possible for reflection devices according to FIG. 11, FIG. 12 and FIG. 13.

Figure 15:
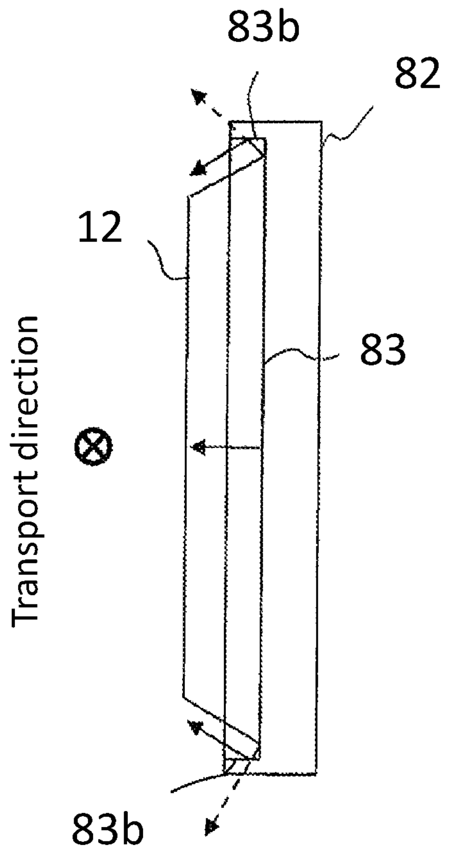
FIG. 15 an example of a reflection device of a checking device of FIG. 8 in a side view.

FIG. 15 shows a second example of a particular design of edge regions of the reflection device 82 in FIG. 10 in a cross-sectional representation perpendicular to the transport direction. In the example shown, the upper and the lower end of the reflecting area (circumferential area) of a cylindrical concave mirror 83 (cf. FIG. 10) each have a plane mirror 83*b*. The plane mirrors 83*b* reflect at least a part of the light emanating from the edge regions of the value document 12, which by the cylindrical concave mirror 83 would be reflected into a region that lies outside the capture region 60 and/or the measuring region of the sensor part (not shown), again into the measuring region—this light is, so to speak, "folded back", as is made clear by the outer solid arrows opposite the dashed arrows—, whereby a possible edge falloff is reduced. Compared to concavely configured ends, plane mirrors are easier to manufacture and thus more cost-effective. A corresponding design of the edge regions is also possible for reflection devices according to FIG. 11, FIG. 12 and FIG. 13.

Figure 16:
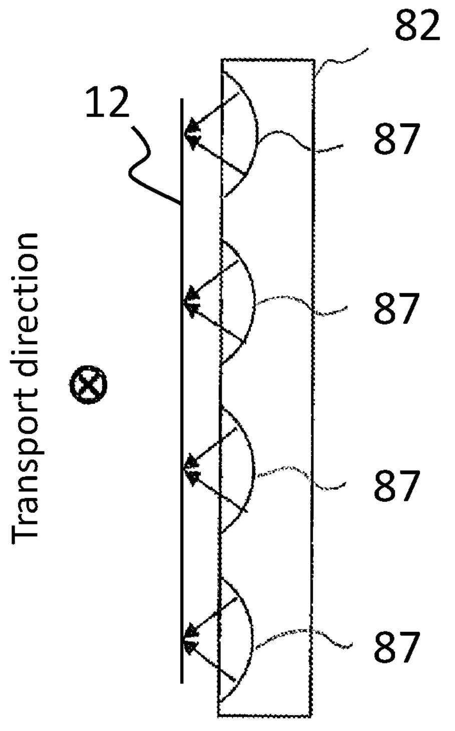
FIG. 16 an example of a reflection device of a checking device of FIG. 8 in a side view.

FIG. 16 shows another example of a design of a reflection device 82 with several spherical mirrors 87 for several tracks. Such a reflection device 82 is employed in particular when the illumination of the value document to be checked is not (at least approximately) a line illumination, but individual tracks with distinct distances between them. In such applications, the excitation and/or luminescent light emanating from the value document 12 is efficiently reflected toward the value document with respectively one single spherical mirror 87 per track.

This can be achieved, as in the example shown, by means of spherical concave mirrors or, analogous to the example shown in FIG. 11, by means of plano-convex lenses that are mirrored on the curved side. Analogous to the variants described above in connection with the FIGS. 12 and 13, Fresnel mirrors or Fresnel lenses can also be used to increase the angle regions.

Figure 17:
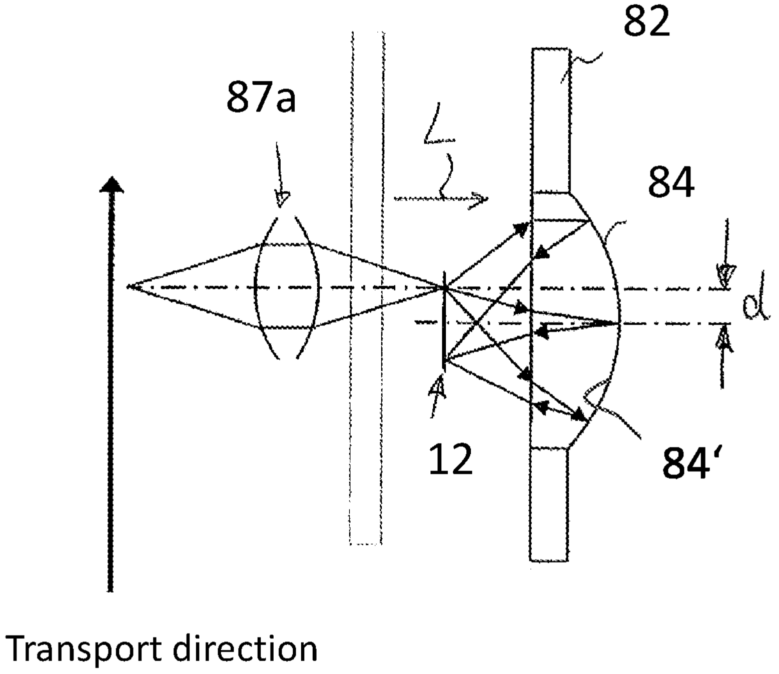
FIG. 17 an example of a reflection device of a checking device of FIG. 8 in a side view.

FIG. 17 shows another embodiment of the reflection device 82 in a schematic side view. This is a variant of the reflection device in FIG. 11. In the example shown, the cylindrical mirror surface 84' of the reflectively coated cylindrical lens 84 is offset by a finite distance d, preferably between 1 and 20 mm, against the transport direction with respect to the illumination optics 87*a* of the excitation device 66 (not shown). This effects that the excitation radiation mirrored back is offset by twice the amount. The luminescence radiation excited by this mirrored excitation radiation may contribute longer to the captured or capturable luminescence radiation, since the value document 12 together with the security feature 74 thereon must be transported further until the security feature 74 has left the detection region 60 of the capture device 68.

In addition to a further improved intensity increase in the capturable luminescence radiation on fast-running bank note processing machines (e.g. >3 m/s, >5 m/s, >7 m/s), this arrangement with offset increases the selectivity with which slow and fast decay time constants of the luminescence can be distinguished.

As an alternative to the offset d, the (cylinder) mirror 84' can also be tilted in its orientation to the perpendicular L of the transport plane.

The foregoing explanations regarding the coated cylindrical lens 84 also apply accordingly to a reflection device 82 with cylindrical concave mirror 83 (cf. FIG. 10), Fresnel cylindrical concave mirror (cf. FIG. 12), coated Fresnel cylindrical lens (cf. FIG. 13) or their spherical variants (cf. FIG. 16).

The advantageous effects of the reflection device 82 described above in connection with the FIGS. 10 to 16 can also be achieved when the reflection device 82 has a retroreflector or is configured as a retroreflector.

The apparatuses and methods described are particularly suitable for checking luminescent features with IR excitation and IR emission, i.e., in the wavelength region from 750 to 2500 nm, preferably from 800 to 2100 nm.

The invention claimed is:

1. A method for checking value documents which have a front side and a back side opposing the front side and which comprise a substrate and a specified luminescent substance applied to the substrate in at least a section of the front side of the value document, comprising the steps of:

irradiating, by means of an excitation device, a first side of the value document with excitation radiation for exciting luminescence of the luminescent substance, wherein the first side is the back side of the value document, reflecting a part of the excitation radiation, which after transmission through the value document has exited on the front side of the value document, and/or reflecting luminescence radiation, which was generated by excitation of the luminescent substance on the front side of the value document by means of the excitation radiation and is emitted on the front side of the value document, wherein upon reflection the excitation radiation and/or luminescence radiation is at least approximately focused at the value document, capturing luminescence radiation which was excited by excitation of the luminescent substance at the front side of the value document by at least a part of the excitation radiation after transmission through the substrate of the value document and exits the value document at least partly at the back side of the value document after transmission through the value document, by means of a capture device, and checking the value document in dependence on at least one property of the captured luminescence radiation by means of an evaluation device.

2. The method according to claim 1, wherein upon checking it is checked whether the captured luminescence radiation represents an indication of the presence of the luminescent substance at the front side of the value document.

3. The method according to claim 1, further comprising:

reflecting a part of the excitation radiation, which after transmission through the value document has exited on the front side of the value document, at least partly back onto the value document, and exciting, by the reflected part, the luminescent substance to emit luminescence radiation, and wherein, when capturing, at least a part of the luminescence radiation excited by the reflected part of the excitation radiation is also captured after transmission to the back side of the value document and exit from the value document.

4. The method according to claim 1, further comprising:

reflecting luminescence radiation, which was generated by excitation of the luminescent substance on the front side of the value document by means of the excitation radiation and is emitted on the front side of the value document, at least partly back onto the value document, and wherein, when capturing, the reflected luminescence radiation is also captured at least partly after transmission to the back side of the value document and exit from the value document.

5. The method according to claim 1, wherein a value document is checked, whose substrate is a polymer substrate.

6. An apparatus for checking value documents which have a front side and a back side opposing the front side and which comprise a substrate and a specified luminescent substance applied to the substrate in at least a section of the front side of the value document, in a capture region of the apparatus, comprising:

an excitation device for irradiating a first side of an individual one of the value documents in the capture region from a first side of the capture region for exciting the luminescent substance to emit luminescence radiation, a capture device for capturing luminescence radiation excited by means of the excitation radiation and emanating from the first side of the value document in the capture region in the direction of the first side of the capture region, and an evaluation device for checking the value document in dependence on at least one property of the captured luminescence radiation, wherein the excitation device, the capture device and the evaluation device are configured for carrying out a method according to claim 1.

7. The apparatus according to claim 6, which is adapted to carry out the method, and for this purpose further comprises a reflection device which reflects back excitation radiation emanating from a second side of the value document opposing the first side and/or luminescence radiation emanating from a second side of the value document opposing the first side.

8. The apparatus according to claim 7, wherein the reflection device is configured to focus the reflected excitation radiation and/or luminescence radiation into the capture region.

9. The apparatus according to claim 7, wherein the reflection device is offset with respect to the excitation device.

10. The apparatus according to claim 6, wherein the evaluation device has an interface by means of which at least one signal is capturable which renders the orientation of the value document, and wherein upon checking, it is also ascertained whether the first side is the front side or the back side.

11. An apparatus for processing value documents which have a front side and a back side opposing the front side and which comprise a substrate and a specified luminescent substance applied to the substrate in at least a section of the front side of the value document, comprising:

a feeding device for value documents to be processed, into which value documents are introducible and outputable therefrom in singled form, an output device in which processed value documents are depositable, a transport device for transporting value documents in singled form from the feeding device along a transport path to the output device, a control device for controlling the transport device and/or output device, and an apparatus for checking value documents according to claim 6, wherein the apparatus for checking and the transport device are configured and disposed such that the transport path extends through the capture region of the apparatus for checking, and wherein the control device is connected to the apparatus for checking via a signal connection and is configured to control the transport device and/or the output device in dependence on results of the apparatus for checking.

12. The method according to claim 1, further comprising checking whether an intensity of the captured luminescence radiation lies within first or second reference intervals.

13. A method for checking value documents which have a front side and a back side opposing the front side and which comprise a substrate and a specified luminescent substance applied to the substrate in at least a section of the front side of the value document, with the steps of:

transporting the value documents individually past an excitation device which is configured to emit excitation radiation for exciting luminescence of the luminescent substance, meanwhile irradiating at least a section of a first side of a respective value document with excitation radiation by means of the excitation device, reflecting a part of the excitation radiation, which after transmission through the value document has exited on the front side of the value document, and/or reflecting luminescence radiation, which was generated by excitation of the luminescent substance on the front side of the value document by means of the excitation radiation and is emitted on the front side of the value document, wherein upon reflection the excitation radiation and/or luminescence radiation is at least approximately focused at the value document, capturing at least a part of the luminescence radiation which emanates from the first side of the value document and which, when the first side is the front side of the value document, has been generated by excitation of the luminescent substance of the value document and has been emitted by the value document, or which, when the first side is the back side of the value document, has been excited by excitation of the luminescent substance of the value document by at least a part of the excitation radiation after transmission through the substrate of the value document and which exits at least partly at the first side after transmission through the substrate, by means of the capture device, and checking the value document in dependence on at least one property of the captured luminescence radiation by means of an evaluation device.

14. The method according to claim 13, further comprising:

reflecting a part of the excitation radiation, which has exited after transmission through the value document on a second side of the value document opposing the first side, at least partly back onto the value document and exciting, by the reflected part, the luminescent substance to emit luminescence radiation, and wherein, when capturing, at least a part of the luminescence radiation excited by the reflected part of the excitation radiation, which emanates from the first side of the value document, is also captured.

15. The method according to claim 14, wherein, upon reflection, the excitation radiation and/or luminescence radiation is focused at least approximately onto the transported value documents.

16. The method according to claim 13, further comprising:

reflecting luminescence radiation, which was generated by excitation of the luminescent substance on the front side of the value document by means of the excitation radiation and emanates from a second side of the value document opposing the first side, at least partly back onto the value document, and wherein, when capturing, the reflected luminescence radiation is also captured at least partly after transmission to the first side of the value document and exit from the value document on the first side.

17. The method according to claim 13, wherein upon checking it is checked whether the captured luminescence radiation represents an indication of the presence of the luminescent substance at the front side of the value document.

18. The method according to claim 13, wherein the checking is carried out in such a way that the result of the checking is independent of whether the first side of the value document is the front side of the value document or the back side.

19. The method according to claim 18, wherein upon checking, an intensity of the captured luminescence radiation is compared with a reference value which is independent of whether the front side is the first side or not.

20. The method according to claim 13, wherein upon checking, at least two check criteria are used, a first one of which is a criterion that the first side is the front side of the value document, and the second check criterion is a criterion that the first side is the back side of the value document.

21. The method according to claim 20, wherein upon checking, it is also ascertained whether the first side is the front side or the back side.

22. The method according to claim 13, further comprising:

capturing an orientation of the value document, wherein the orientation renders whether the first side of the value document is the front side or the back side, and wherein checking is carried out depending on the captured orientation of the value document.

23. The method according to claim 13, further comprising checking whether an intensity of the captured luminescence radiation lies within first or second reference intervals.

24. A method for checking value documents which have a front side and a back side opposing the front side and which comprise a substrate and a specified luminescent substance applied to the substrate in at least a section of the front side of the value document, with the steps of:

transporting the value documents individually past an excitation device which is configured to emit excitation radiation for exciting luminescence of the luminescent substance, meanwhile irradiating at least a section of a first side of a respective value document with excitation radiation by means of the excitation device, reflecting a part of the excitation radiation, which has exited after transmission through the value document on a second side of the value document opposing the first side, at least partly back onto the value document and exciting, by the reflected part, the luminescent substance to emit luminescence radiation, and/or reflecting luminescence radiation, which was generated by excitation of the luminescent substance on the front side of the value document by means of the excitation radiation and emanates from a second side of the value document opposing the first side, at least partly back onto the value document, wherein, upon reflection, the excitation radiation and/or luminescence radiation is focused at least approximately onto the transported value document, capturing at least a part of the luminescence radiation which emanates from the first side of the value document and which, when the first side is the front side of the value document, has been generated by excitation of the luminescent substance of the value document and has been emitted by the value document, or which, when the first side is the back side of the value document, has been excited by excitation of the luminescent substance of the value document by at least a part of the excitation radiation after transmission through the substrate of the value document and which exits at least partly at the first side after transmission through the substrate, by means of a capture device, wherein, when capturing, at least a part of the luminescence radiation excited by the reflected part of the excitation radiation, which emanates from the first side of the value document, is also captured, and/or when capturing, the reflected luminescence radiation is also captured at least partly after transmission to the first side of the value document and exit from the value document on the first side, and checking the value document in dependence on at least one property of the captured luminescence radiation by means of an evaluation device.

25. An apparatus for checking value documents which have a front side and a back side opposing the front side and which comprise a substrate and a specified luminescent substance applied to the substrate in at least a section of the front side of the value document, in a capture region of the apparatus, comprising:

an excitation device for irradiating a first side of an individual one of the value documents in the capture region from a first side of the capture region for exciting the luminescent substance to emit luminescence radiation, a reflection device which reflects back excitation radiation emanating from a second side of the value document opposing the first side and/or luminescence radiation emanating from a second side of the value document opposing the first side, and which is configured to focus the reflected excitation radiation and/or luminescence radiation into the capture region, a capture device for capturing luminescence radiation excited by means of the excitation radiation and emanating from the first side of the value document in the capture region in the direction of the first side of the capture region, and an evaluation device for checking the value document in dependence on at least one property of the captured luminescence radiation, wherein the excitation device, the capture device and the evaluation device are configured for carrying out a method according to claim 24.

* * * * *